(12) United States Patent
Guo et al.

(10) Patent No.: US 9,650,487 B1
(45) Date of Patent: May 16, 2017

(54) POLYALKYLENE IMIDE AEROGELS AND PROCESSES FOR MAKING THE SAME

(71) Applicant: The United States of America as represented by the Administrator of the National Aeronautics and Space Administration, Washington, DC (US)

(72) Inventors: Haiquan Guo, Avon, OH (US); Mary Ann B. Meador, Strongsville, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 24 days.

(21) Appl. No.: 14/698,084

(22) Filed: Apr. 28, 2015

Related U.S. Application Data

(60) Provisional application No. 62/014,734, filed on Jun. 20, 2014.

(51) Int. Cl.
*C08J 9/00* (2006.01)
*C08J 9/28* (2006.01)

(52) U.S. Cl.
CPC .............. *C08J 9/28* (2013.01); *C08J 9/0023* (2013.01); *C08J 2379/08* (2013.01)

(58) Field of Classification Search
CPC ........ C08J 9/86; C08J 9/286; C08J 2201/026; C08J 2201/0502; C08J 2205/026; C08J 2379/108
See application file for complete search history.

(56) References Cited

U.S. PATENT DOCUMENTS

| | | | |
|---|---|---|---|
| 7,071,287 B2 * | 7/2006 | Rhine | B01J 13/0091 423/439 |
| 7,691,911 B2 | 4/2010 | Lee et al. | |
| 8,501,319 B2 | 8/2013 | Leventis et al. | |
| 8,608,991 B2 | 12/2013 | Gawryla et al. | |
| 8,637,582 B2 | 1/2014 | Gawryla et al. | |
| 2004/0132845 A1 * | 7/2004 | Rhine | B01J 13/0091 521/82 |
| 2010/0160472 A1 | 6/2010 | Lee et al. | |
| 2012/0088855 A1 | 4/2012 | Gawryla et al. | |
| 2012/0134909 A1 * | 5/2012 | Leventis | B82Y 30/00 423/439 |
| 2012/0175546 A1 | 7/2012 | Dong et al. | |
| 2013/0022769 A1 | 1/2013 | Sabri et al. | |
| 2014/0147607 A1 | 5/2014 | Leventis et al. | |

OTHER PUBLICATIONS

Meador, et al., Mechanically Strong, Flexible Polyimide Aerogels Crosslinked with Aromatic Triamine, ACS Applied Materials & interfaces, 2012.*

* cited by examiner

*Primary Examiner* — Irina S Zemel
(74) *Attorney, Agent, or Firm* — Robert H. Earp. III

(57) ABSTRACT

An aerogel and process of making the aerogel are provided. The aerogel is a polyimide aerogel having polyamide cross-links formed using a poly(maleic anhydride) cross-linker.

24 Claims, 32 Drawing Sheets

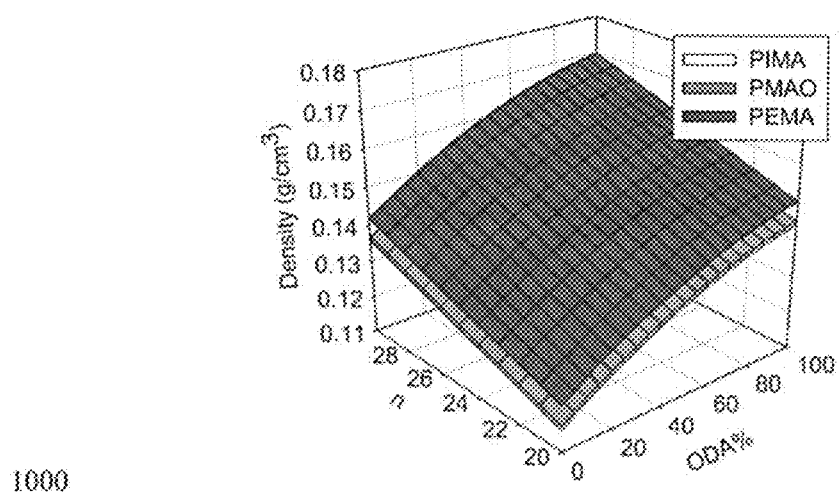
Fig .10A
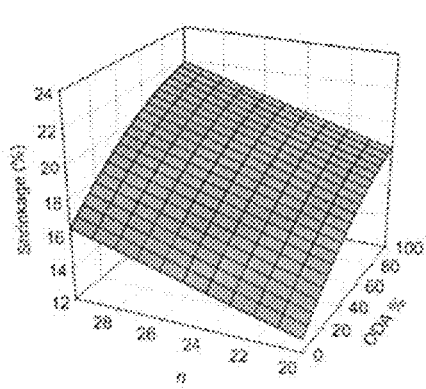 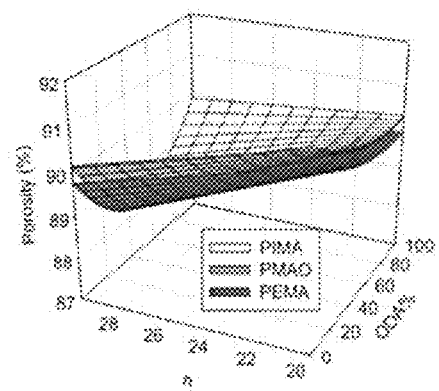
Fig.10B  Fig.10C

1700

1701

1705

1709

(f)

1950

POLYALKYLENE IMIDE AEROGELS AND PROCESSES FOR MAKING THE SAME

CROSS-REFERENCE TO RELATED APPLICATION

This application claims the benefit of U.S. Provisional Patent Application Ser. No. 62/014,734, which was filed Jun. 20, 2014. The subject matter of this earlier filed application is hereby incorporated by reference in its entirety.

ORIGIN OF THE INVENTION

The invention described herein was made by employees of the United States Government and may be manufactured and used by or for the Government for Government purposes without the payment of any royalties thereon or therefore.

FIELD

The present invention pertains to polymer aerogels. In particular, the present invention relates to polyalkylene imide aerogels.

BACKGROUND

Aerogels are low density solids having low thermal conductivity, a low dielectric constant, and a high surface area, among other properties, due to their fine porous structure. Aerogels consist of a solid network structure, and are made, for example, by extracting a liquid portion of a gel through supercritical fluid extraction while allowing the gel to maintain a solid structure. Polyimide aerogels combine low thermal conductivity and a low dielectric constant with excellent mechanical properties in comparison with silica and polymer-silica hybrid aerogels.

Polyimides are polymers of imide monomers. Polyimides have the general chemical structure shown immediately below.

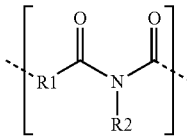

Polyimide aerogels are excellent insulators due to their high porosity, low thermal conductivity, flexibility, and low density. Accordingly, polyimide aerogels are useful for various applications ranging from lightweight substrates for high performance antennae to flexible insulation for space suits and spacecraft decelerators, such as inflatable structures for spacecraft entry, descent, and landing (EDL) on planets, among other applications. Finding cost efficient precursors to synthesize polyimide aerogels, however, is crucial to large scale manufacturing and commercialization.

Certain polyamines, organic compounds with plural primary amino groups, namely, 1,3,5-triaminophenoxybenzene (TAB), 2,4,6-tris(4-aminophenyl)pyridine (TAPP), octa(aminophenoxy)silsesquioxane (OAPS), or 1,3,5-tris(aminophenyl)benzene (TAPB), have been used to cross-link anhydride end-capped polyimide oligomers for synthesizing polyimide aerogels. Polyamine cross-linkers known to be suitable for synthesizing polyimide aerogels have been found to be commercially unavailable at times, and somewhat expensive, thus inhibiting scale-up of manufacturing and production of polyimide aerogels for widespread use.

Moisture resistance is also an important consideration for polyimide aerogels. Hydrophobic silica aerogels have been generally fabricated by modifying the silica surface using hydrophobic groups. Hydrophobicities of cellulose aerogels, resorcinol-formaldehyde aerogel, organic aerogels made with phenolic resole, and methylated melamine have also been formed. Moreover, properties of OAPS cross-linked polyimide aerogels using ODA in combination with either of the rigid diamines p-phenylene diamine (PPDA) or 2, 2'-dimethylbenzidine (DMBZ) have been formed and characterized. For example, DMBZ or PPDA was used to replace up to 100 mol % ODA to optimize the mechanical properties, thermal stability, resistance to moisture, and other properties of the polyimide aerogels. All polyimide aerogels reported previously that include moisture resistant formulation and contain more than 50% DMBZ, however, have contact angles only in the range of 85°-90°.

Thus, an alternative polyimide aerogel and process of manufacture may be beneficial. In particular, a low cost alternative for mechanically strong polymer aerogels may be beneficial.

SUMMARY

Embodiments of the present invention provide solutions to these and other problems and needs in the art, and may provide solutions to problems and needs in the art that have not yet been fully solved by conventional polyimide aerogels and manufacturing processes. Embodiments pertain to polyimide aerogels and processes for manufacturing polyimide aerogels formed using a low cost cross-linker and an amine end capped polyimide oligomer solution.

Processes of embodiments using a poly(maleic anhydride) cross-linker enable use of amine capped polyimide oligomers. Accordingly, processes of some embodiments are amenable to scaled-up and continuous process aerogel manufacturing for making, for example, roll-to-roll films and molded parts. Aerogels in accordance with some embodiments may include a backbone formed of poly(maleic anhydride)-cross-linked polyimide oligomers that provide low density, high porosity, high surface area, and a desirable Young's modulus. Aerogels of some embodiments may be suitable for a variety of aeronautic and space applications, including space suit insulation for planetary surface missions, insulation for inflatable structures for habitats, and cryotank insulation for advanced space propulsion systems.

An aerogel in accordance with an embodiment may include a polyimide component cross-linked by a poly(maleic anhydride) cross-link. The polyimide component may include 4, 4'-oxidianiline or 2, 2'-dimethylbenzidine, for example.

A process useful for making a polyimide aerogel, may include providing a poly(amic acid) oligomer solution, chemically imidizing the poly(amic acid) oligomers of the provided poly(amic acid) oligomer solution, the poly(amic acid) oligomers comprising amine terminated poly(amic acid) oligomers formed using 4, 4'-oxidianiline (ODA) or 2, 2'-dimethylbenzidine (DMBZ), for example, and adding poly(maleic anhydride) to the poly(amic acid) oligomer solution to cross-link poly(amic acid) oligomers of the poly(amic acid) oligomer solution, and then chemically imidize the cross-linked poly(amic acid) to cross-linked polyimide.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIGS. 10A-10C show empirical models of density, shrinkage, and porosity, respectively, of aerogels after supercritical drying and vacuum drying at 75° C. in processes in accordance with some embodiments.

DETAILED DESCRIPTION OF THE EMBODIMENTS

Processes in accordance with some embodiments include using cross-linkers with polyanhydride groups, poly(maleic anhydride)s, to cross-link with amine end capped polyimide oligomers. Poly(maleic anhydride)s have been used since the 1940s for emulsion stabilizers, detergent compositions, and viscosity modifiers. They are commercially available and cheaper than other potential cross-linkers, and it is of interest to synthesize aerogels using these as cross-linkers to make large scale manufacturing feasible. Thus, commercially available poly(maleic anhydride)s may be used as cross-linkers to cost-effectively prepare aerogel having desirable properties.

Figure 1:
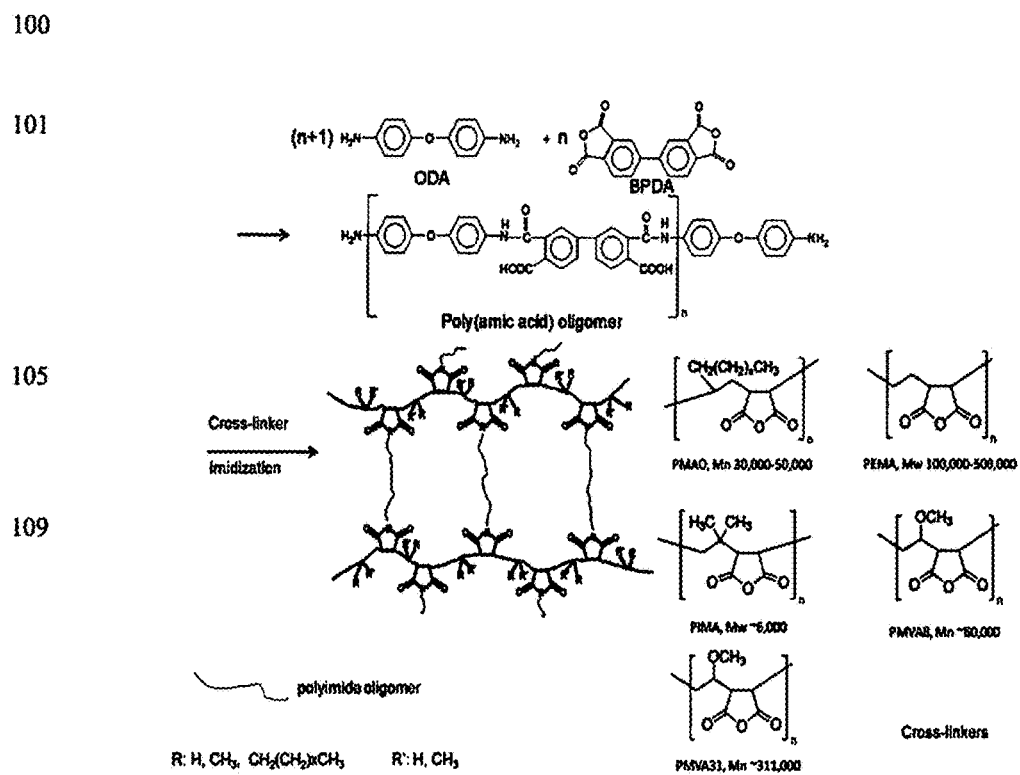
FIG. 1 shows a process for forming polyimide aerogel having poly(maleic anhydride) cross-links in accordance with an embodiment of the present invention.

FIG. 1 shows a process 100 in accordance with an embodiment for forming aerogels using poly(maleic anhydride)s to cross-link diamine terminated poly(amic acid). Poly(maleic anhydride)s having different side groups and different molecular weight may be used for forming aerogels in accordance with processes of embodiments such as that shown in FIG. 1. These may include poly(maleic anhydride-alt-1-octadecene) (PMAO, Mn 30,000-Mn 50,000), poly (ethylene-alt-maleic anhydride) (PEMA, Mw 100,000-500,000), poly (isobutylene-alt-maleic anhydride) (PIMA, Mw 6000), and poly(methyl vinyl ether-alt-maleic anhydride) (Mn 80,000 and 311,000) (PMVA-8 and PMVA-31).

Different diamines may be combined with different dianhydrides such as biphenyl-3,3',4,4'-tetracarboxylic dianydride (BPDA) or 3,3',4,4'-benzophenone tetracarboxylic, dianhydride (BTDA) to form amine capped polyimide backbones. The oligomers may then cross-linked with different poly(maleic anhydride) cross-linkers. The polyimide chain may be formed using various dianhydrides and diamines. Dianhydrides may be selected from the group including benzophenone-3,3',4,4'-tetracarboxylic dianhydride (BTDA) and biphenyl-3,3',4,4'-tetracarboxylic dianhydride (BPDA). Diamines may be selected from the group including 3,4-oxydianiline (3,4-ODA), 4,4-oxydianiline (4,4-ODA or ODA), p-phenylene diamine (PPDA), DMBZ, 4,4-bis(4-aminophenoxy)biphenyl, 2,2-bis[4-(4-aminophenoxy)phenyl]propane, and bisaniline-p-xylidene (BAX). Additional suitable diamines include m-phenylenediamine, 4,4-bis (aminophenoxy)-2,2-dimethylbiphenyl (BAPD), 4,4'-[1,3-phenylenebis(1-methyl-ethylidene)]bisaniline (bisaniline-M), 2,2-bis[4-(4-aminophenoxy)phenyl]hexafluoropropane (HFBAPP), and (poly(propylene glycol) bis(2-aminopropyl ether) (PPG-230 or PPG-400).

The poly(alkylene maleic anhydride) may be poly(maleic anhydride-alt-1-octadecene) (PMAO), poly(isobutylene-alt-maleic anhydride) (PIMA), Poly(ethylene-alt-maleic anhydride) (PEMA), or Poly(methyl vinyl ether-alt-maleic anhydride) (PMVEMA). The repeat unit (n value) of the polyimide, the combinations of the dianhydride and diaimine, different poly(alkylene maleic anhydride) backbones, and the total amount of the precursors may be varied to achieve the desired properties.

The effects of the backbone structure on density, porosity, shrinkage, surface area, morphology, and mechanical properties of the aerogels were observed in actual examples. For example, it was found that aerogels in accordance with some embodiments have a low density, (0.04-023 g/cm3), high porosity (>88%), high surface area (367-421 m2/g), and a Young's modulus in the range of 15-39 MPa. Aerogels containing aliphatic diamines were observed to have contact angles of up to 124°.

In FIG. 1, process 100 includes forming a polyimide aerogel by providing at 101 amine capped poly(amic acid) oligomers in solution. The poly(Maleic anhydride) is added at 105 to cross-linked the amine capped poly(amic acid) oligomers, and the cross-linked poly(amic acid) are chemically imidized at 105 at room temperature using trimethylamine (TEA) as an amine catalyst and acetic anhydride as a water scavenger. Imidization is a cyclodehydration reaction including the conversion of a polyimide precursor into an imide.

Then, at 109, the solution is poured into a mold, and subsequently dried to produce gels with cross-links. Aerogels may be produced by $CO_2$ supercritical fluid extraction applied to the polyimide gels. Accordingly, process 100 shown in FIG. 1 may include generating amine-capped polyimide oligomers in solution that are chemically imidized, and adding the poly(maleic dianhydride) cross-linker to produce a gel that may be processed to produce an aerogel.

As shown in FIG. 1, process 100 may include, at 101, adding a number components n of biphenyl-3,3', 4,4'-tetracarboxylic dianhydride (BPDA) to n+1 components of diamine, for example, 4,4'-oxidianiline (ODA) or 2,2'-dimethylbenzidine (DMBZ). The n equivalent of BPDA may be added to the n plus one equivalent of diamine in solution, for example, in methylpyrrolidinone (NMP) and stirred until dissolved. The resulting poly(amic acid) solution may be stored for extended periods of time without gelation.

Poly(maleic anhydride) may be added to the solution, at 105. For example, a solution of poly(maleic anhydride) in NMP may be added, while stirring, to the oligomer solution produced at 105. The solution will continue to stir for 15 minutes, Acetic anhydride may be added to the solution of cross-linked poly(amic acid) in NMP, and mixed to homogeneity. TEA may then be added at 105. The resulting solution may be poured into molds, and allowed to gel for about 10 to 25 minutes, at 109. The gels may be aged for a day, then extracted into a solution of, for example, 75% NMP in acetone, 25% NMP in acetone, and then three times in acetone. Several solvent exchanges with preferably decreasing concentrations of NMP, and eventually only acetone, may be performed in 24 hour intervals. The gels may be submerged in solvent, and sealed under pressure, for example, at 78 bar and 25° C. then multiple steps of subcritical and supercritical $CO_2$ soaking and rinsing may be performed, and finally the gels may be converted to aerogels by supercritical fluid extraction.

Vacuum drying at 75° C. overnight may remove the remaining solvent.

ACTUAL EXAMPLES

Actual example aerogels made in accordance with some embodiments were produced. The example aerogels were compared with conventional aerogels and tested. Amine capped polyimide oligomers were formed in solution and chemically imidized. Then, poly(maleic anhydride) was added to produce polyalkylene gels with poly(maleic anhydride) cross-links.

BPDA was purchased from UBE, Inc. ODA and DMBZ were purchased from Omni Specialty Chemicals, Inc. PPG-230 and PPG-400, PMAO, PEMA, PIMA, PMVA8, PMVA31, HPLC grade N-methyl-2-pyrrolidinone (NMP), anhydrous acetic anhydride, and TEA were purchased from Sigma-Aldrich. All reagents were used without further purification. BPDA was dried at 125° C. in vacuum for 24 hours before use.

Attenuated total reflectance (ATR) infrared spectroscopy was obtained using a Nicolet Nexus 470 FT-IR spectrometer. Solid $^{13}C$ NMR spectroscopy was carried out with a Bruker Avance-300™ spectrometer, using cross-polarization and magic angle spinning at 11 KHz. The solid $^{13}C$ spectra were externally referenced to the carbonyl of glycine (176.1 relative to tetramethylsilane, TMS). Scanning electron micrographs were obtained using a Hitachi S-4700™ field emission scanning microscope after sputter coating the samples with gold. The samples were out-gassed at 80° C. for 8 hours under vacuum before running nitrogen-adsorption porosimetry with an ASAP 2000™ surface Area/Pore Distribution analyzer (Micromeritics Instrument Corp.). The skeletal density was measured using a Micromeritics Accupyc 1340™ helium pycnometer. Using bulk density ($\rho_b$) and skeletal density ($\rho_s$) measured by helium pycnometry, the percent porosity was calculated using equation 1: Porosity=$(1-\rho_b/\rho_s)\times 100\%$. Thermal gravity analyses (TGA) were performed using a TA model 2950 HiRes instrument. Samples were run at a temperature ramp rate of 10° C. per minute from room temperature to 750° C. under nitrogen or air.

The specimens were cut and polished to make sure that the top and bottom surfaces were smooth and parallel. Samples were conditioned at room temperature for 48 hours prior to testing. The diameter and length of the specimens were measured before testing. The specimens were tested with the sample sizes close to the 1:1.25 ratio of diameter to length. The samples were tested between a pair of compression plates with an AT4, 500 lb. load cell. All testing was carried out at nominal room conditions, and at a crosshead speed of 0.05 in/min as dictated by the ASTM guidelines. The aerogels were crushed to 80% strain or the full capacity of the load cell (whichever occurred first). The Young's modulus was taken as the initial linear portion of the slope of the stress strain curve.

Example 1

Preparation of aerogel monoliths made with ODA using different cross-linkers. Poly(amic acid) oligomer was formulated in NMP using a molar ratio of ODA to BPDA of (n+1) to n, which was formulated to provide oligomers with an average of n repeat units terminated with anhydride, as shown in Table 1 below. Various poly(maleic anhydride)s were used to react with the amine groups of ODA on the poly(amic acid) oligomers. A PMVA8 cross-linked sample procedure for an oligomer (n=20) made with BPDA and ODA with total precursor 10 w/w % is as follows: to a stirred solution of ODA (1.4045 g, 7.01 mmol) in 28 mL NMP was added BPDA (1.9654 g, 6.68 mmol). The mixture was stirred until all BPDA was dissolved, and a solution of PMVA8 (0.1042 g, 0.0013 mmol) in 2.415 mL NMP was added. The resulting solution was stirred for 15 minutes, after which acetic anhydride (5.295 mL, 56.0 mmol) and then TEA (1.96 mL, 14.1 mmol) were added. Acetic anhydride to BPDA is formulated in the ratios 8:1. The ratio of TEA to BPDA is 2:1. The solution was continually stirred for 10 minutes and then poured into a 20 mL syringe mold (2 cm in diameter), prepared by cutting off the needle end of the syringe and extending the plunger all the way out.

The gels, which formed within 30 minutes, were aged in the mold for one day before extracting into fresh NMP to soak for 24 hours to remove acetic acid and TEA. The solvent within the gels was then exchanged to acetone in 24 hour intervals five times. The gels were then placed in a supercritical fluid extraction chamber in acetone, and washed with liquid $CO_2$ then heated to 45° C. and the $CO_2$ was converted into a supercritical state and gaseous $CO_2$ was slowly vented out. The resulting aerogel was further vacuum dried at 75° C. overnight. The dry aerogels produced in this way have a density of 0.150 g/cm³ and porosity of 90.2%. $^{13}$C CPMAS NMR (ppm): 165 ppm, 157 ppm, 153 ppm, 143 ppm, 130 ppm, 122 ppm, 30 ppm, 23 ppm. FTIR (cm$^{-1}$): 1774, 1716, 1620, 1500, 1419, 1373, 1306, 1290, 1240, 1171, 1114, 1086, 1014, 939, 879, 829, 765, 738.

One way Anova analysis was conducted using Excel™. If the calculated p value is bigger than 0.1, there is a 90% confidence that the properties of the cross-linked aerogels are not statistically equal. A least significant difference (LSD) test is conducted to tell which means are different:

$$LSD = \sqrt{\frac{2\times MSE \times F1, N-c}{r}},$$

where N represents the total numbers of the data, c represents the numbers of the columns, and r is the number of the repeat for each kind of cross-linked sample. There were five kinds of cross-linkers and each formulation were repeated twice, thus c=5, r=2, and N=10. If the difference between any two means is greater than the LSD, they are not statistically equal.

PMAO, PIMA, PEMA, PMVA-8 and PMVA-31, listed in FIG. 1, were chosen as the cross-linkers to study the properties of the aerogels. These cross-linkers all have poly(maleic anhydride)s as a basic structure, but have different side groups. Aerogels were made in NMP, with equivalent ratios of ODA to BPDA of (n+1) to n upon mixing. Amber colored poly(amic acid) oligomers with terminal amine groups were formed in solution.

Figure 2:
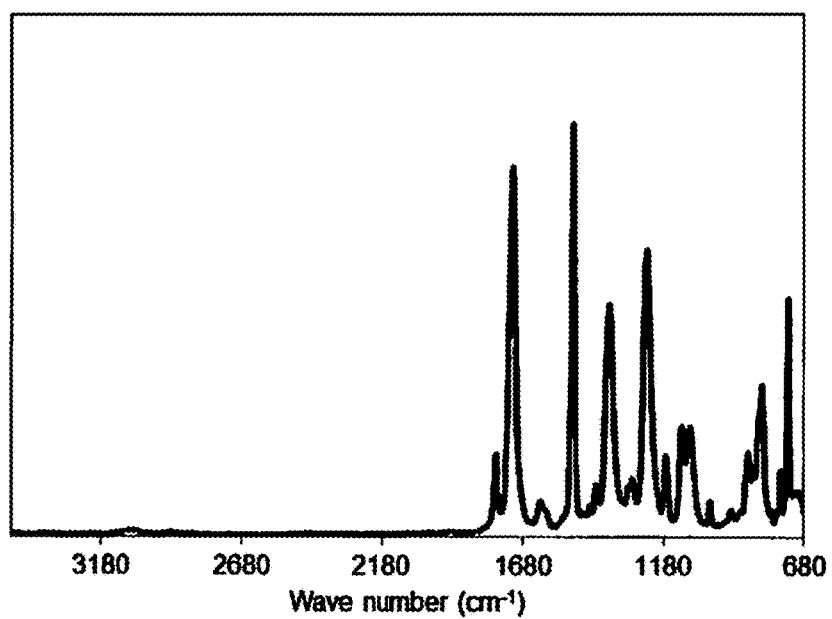
FIG. 2 shows an FTIR spectra of the aerogels cross-linked by the various selected cross-linkers.

Graph 200 of FIG. 2 shows an FTIR spectra of the aerogels cross-linked by the various selected cross-linkers. The aerogel samples tested contain characteristic bands for polyimides, such as 1373 cm$^{-1}$ (v imide C—N), 1716 cm$^{-1}$ (symmetric v imide C=O) and 1774 cm$^{-1}$ (asymmetric v imide C=O). The band at ~1860 cm$^{-1}$ corresponding to unreacted anhydride and bands at ~1807 cm$^{-1}$ and 980 cm$^{-1}$ expected for the isoimide are not observed in the FTIR spectra. In addition, bands at ~1660 cm$^{-1}$ (v amic acid C=O) and ~1535 cm$^{-1}$ (v amide C—N) are absent, further indicating that imidization is completed. There is a small peak at 2927 cm$^{-1}$ that may due to $CH_2$ stretching vibrations of the cross-linkers.

Figure 3:
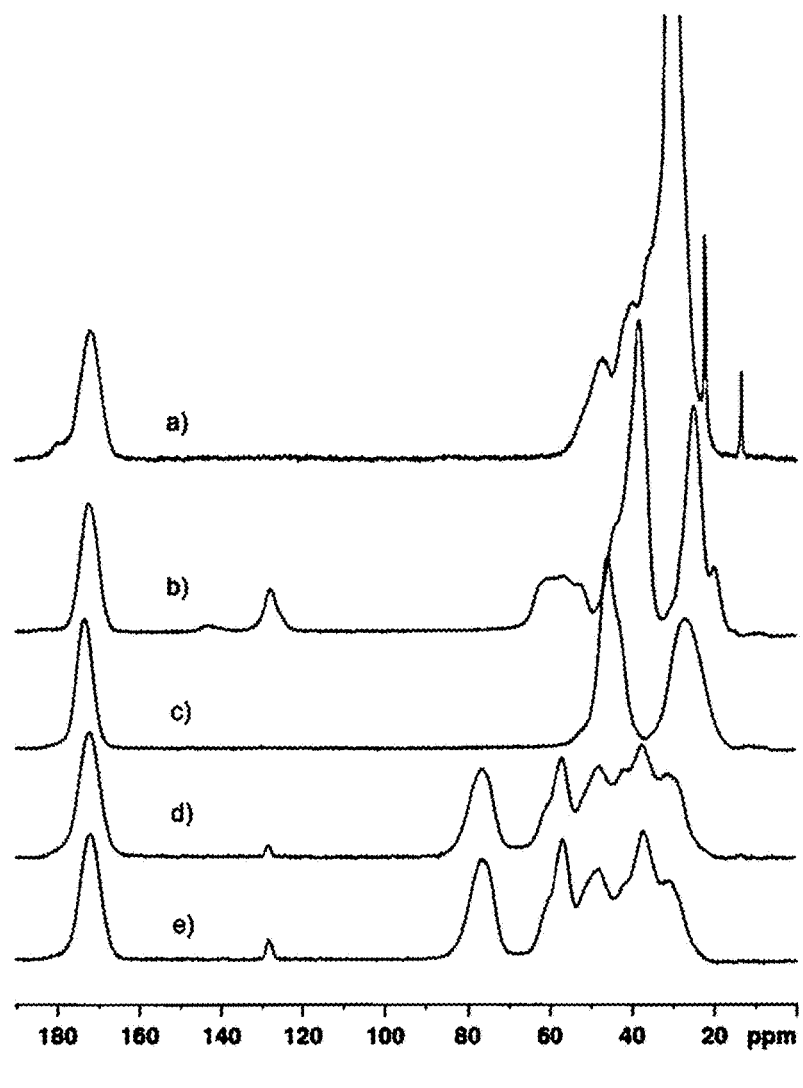
FIG. 3 shows $^{13}$C NMR spectra for samples having different poly(maleic anhydride) cross-linkers in accordance with embodiments.

Graph 300 of FIG. 3 shows $^{13}$C NMR spectra for samples having different poly(maleic anhydride) cross-linkers. All the cross-linkers have the same backbone structures as PEMA, which have three carbon environments, an ethylene backbone, a maleic anhydride backbone, and carbonyl carbons at 24.5, 44.5, and 172 ppm. With different side groups, the other four cross-linkers show different NMR chemical shifts, while all the cross-linkers have peaks due to the aliphatic groups at 20-60 ppm. PMVA8 and PMVA31 show aliphatic ether carbon peak at 75 ppm.

Figure 4:
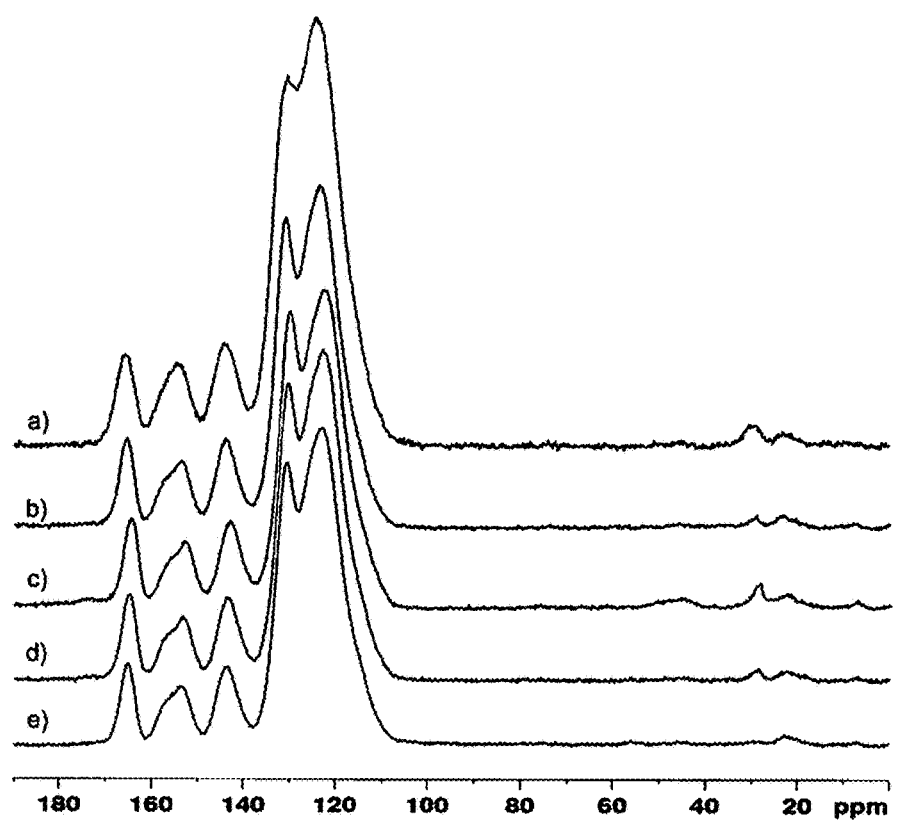
FIG. 4 shows a $^{13}$C NMR spectra show the aerogels made with ODA, 10 w/w %, and n=20 using PMAO, PIMA, PEMA, PMVA8, and PMVA31 as cross-linkers in accordance with some embodiments.

Graph 400 of FIG. 4 shows the $^{13}$C NMR spectra of the aerogels made with ODA, 10 w/w %, and n=20 using PMAO, PIMA, PEMA, PMVA8, and PMVA31 as cross-linkers. All the cross-linked aerogel samples contain an imide carbonyl peak at approximately 165 ppm, and aromatic peaks between 115 ppm and 143 ppm. The peak at 153 ppm is corresponding to the aromatic ether carbon of ODA. The small peaks at 28 ppm and 23 ppm are attributed to the aliphatic carbons on the cross-linkers.

Process variables and properties of the polyimide aerogels prepared in the study are summarized in Table 1.

| run# | Cross-linker type | Density (g/cm3) | Shrinkage (%) | Porosity (%) | Surface Area (m2/g) | Modulus (MPa) |
|---|---|---|---|---|---|---|
| 1 | PEMA | 0.144 | 19.7 | 90.2 | 402 | 18 |
| 2 | PIMA | 0.139 | 18.9 | 90.6 | 421 | 24 |
| 3 | PMAO | 0.134 | 17.1 | 91.2 | 384 | 30 |
| 4 | PMVA31 | 0.145 | 20.0 | 90.4 | 409 | 27 |
| 5 | PMVA8 | 0.150 | 20.9 | 90.2 | 390 | 25 |
| 6 | PEMA | 0.148 | 20.0 | 90.1 | 420 | 39 |
| 7 | PMAO | 0.133 | 19.1 | 91.4 | 406 | 19 |
| 8 | PMVA31 | 0.144 | 19.8 | 90.4 | 420 | 35 |

-continued

| run# | Cross-linker type | Density (g/cm3) | Shrinkage (%) | Porosity (%) | Surface Area (m2/g) | Modulus (MPa) |
|---|---|---|---|---|---|---|
| 9 | PIMA | 0.126 | 19.3 | 91.6 | 389 | 24 |
| 10 | PMVA8 | 0.147 | 20.3 | 90.3 | 418 | 15 |

Table 1 shows the properties of aerogels made with BPDA and ODA (n=20, 10 w/w %) and cross-linked with different cross-linkers (PMAO, PIMA, PEMA, PMVA8, and PMVA31). The density (standard deviation=0.0078 g/cm$^3$) of the aerogels ranged from 0.126-0.150 g/cm$^3$. The shrinkage (standard deviation=1.03) of the aerogels ranged from 17.0-21%. All the cross-linked aerogels have porosity (standard deviation=0.55) around 90%. Analyzed by one way Anova, p values of densities (0.042), shrinkages (0.084), and porosities (0.05) are smaller than the significance level α value (0.1) and also the F observed values for the densities (5.66), shrinkages (3.88) and porosities (5.17) are larger than the F critical value (3.52), so it can be concluded that 90% certain that the densities, shrinkages, and porosities of the cross-linked aerogels are not equal.

From the least significant difference, as shown in Table 2 below, the difference of the density, shrinkage, and porosity means of PIMA and PMAO cross-linked aerogels are 0.001 g/cm$^3$, 1%, and 0.2%, which are smaller the LSD values separately, 0.00892 g/cm$^3$, 1.37%, and 0.66%, thus PIMA and PMAO cross-linked aerogels have no statistical difference in density, shrinkage, and porosity:

|  | density | shrinkage | porosity | surface area | modulus |
|---|---|---|---|---|---|
| P value | 0.042 | 0.084 | 0.05 | 0.80 | 0.74 |
| F | 5.66 | 3.88 | 5.17 | 0.41 | 0.50 |

| Groups | Density Average (g/cm³) | Difference in density means (g/cm³) | | | | density LSD (g/cm³) |
|---|---|---|---|---|---|---|
| | | PEMA | PIMA | PMAO | PMVA8 | |
| PEMA | 0.146 | | | | | 0.00892 |
| PIMA | 0.1325 | 0.0135 | | | | |
| PMAO | 0.1335 | 0.0125 | 0.001 | | | |
| PMVA8 | 0.1485 | 0.0025 | 0.016 | 0.015 | | |
| PMVA31 | 0.1445 | 0.0015 | 0.012 | 0.011 | 0.004 | |

| Groups | Shrinkage Average (%) | Difference in shrinkage means (%) | | | | Shrinkage LSD (%) |
|---|---|---|---|---|---|---|
| | | PEMA | PIMA | PMAO | PMVA8 | |
| PEMA | 19.85 | | | | | 1.374 |
| PIMA | 19.1 | 0.75 | | | | |
| PMAO | 18.1 | 1.75 | 1 | | | |
| PMVA8 | 20.6 | 0.75 | 1.5 | 2.5 | | |
| PMVA31 | 19.9 | 0.05 | 0.8 | 1.8 | 0.7 | |

| Groups | Porosity Average (%) | Difference in porosity means (%) | | | | Porosity LSD (%) |
|---|---|---|---|---|---|---|
| | | PEMA | PIMA | PMAO | PMVA8 | |
| PEMA | 90.15 | | | | | 0.656 |
| PIMA | 91.1 | 0.95 | | | | |
| PMAO | 91.3 | 1.15 | 0.2 | | | |
| PMVA8 | 90.25 | 0.1 | 0.1 | 1.05 | | |
| PMVA31 | 90.4 | 0.25 | 0.7 | 0.9 | 0.15 | |

Similarly, PEMA, PMVA8, and PMVA31 cross-linked aerogels have no statistical difference in density, shrinkage, and porosity. PIMA and PMAO cross-linked aerogels, however, have statistically significantly lower density, lower shrinkage, and higher porosity than the aerogels cross-linked by PEMA, PMVA8, or PMVA31.

Figure 5A:
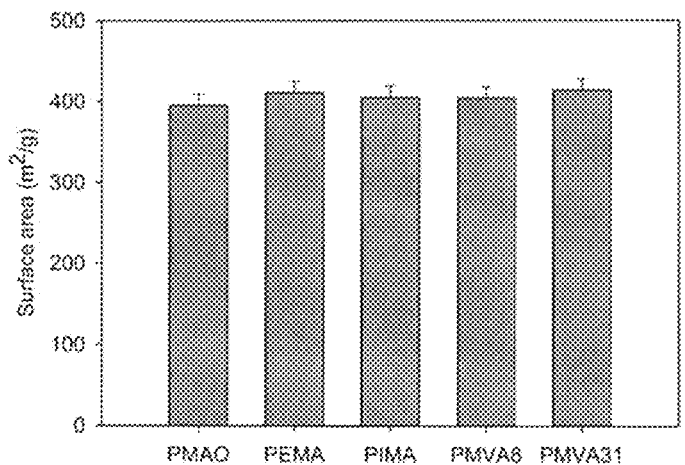
FIG. 5A shows observed surface areas of aerogels made with ODA and various cross-linkers used in accordance with some embodiments.

The surface areas and pore volume of the monoliths were measured by nitrogen sorption using the Branuaer-Emmet-Teller (BET) method. The nitrogen sorption isotherms for all of the aerogels are IUPAC type IV curves with an HI hysteresis loop, indicating that the monoliths consist predominately of three dimensional continuous meso-macropores. As seen from Graph 500 of FIG. 5A, the surface areas (standard deviation=14.20 m$^2$/g) of the aerogels made with ODA and various cross-linkers are from 384 m$^2$/g to 421 m$^2$/g. From the one way ANOVA analysis, the p value (0.80) of the surface area is bigger than the α value (0.1) and F observed value (0.41) is smaller than the F critical value (3.52), so it is 90% certain that the surface area of all aerogels cross-linked with poly(maliec anhydride)s are not statistically significantly different over and above standard error. However, all selected cross-linked aerogels have higher surface area than previous reported OAPS cross-linked polyimide aerogel, similar to the TAB cross-linked polyimide aerogels, but lower than BTC cross-linked aerogels.

Figure 5B:
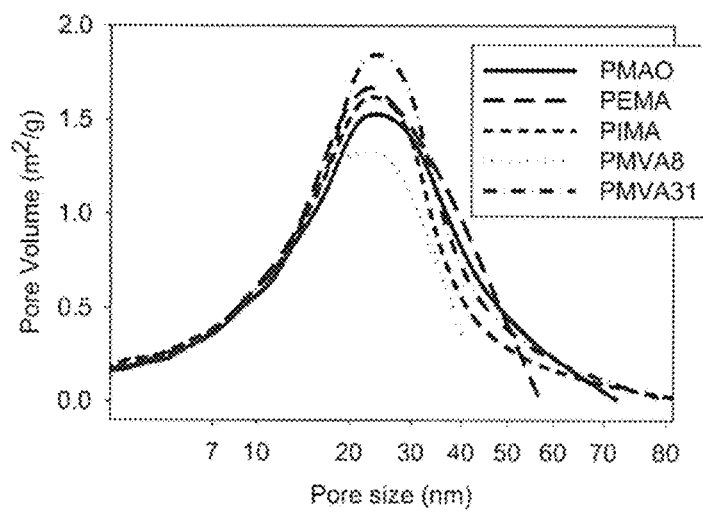
FIG. 5B shows pore volume and pore size of pore structures of aerogels of and made with ODA in accordance with some embodiments.

Graph 510 of FIG. 5B shows that the cross-linked aerogels have similar pore size distribution peak, around 23 nm. According to IUPAC definition, pores are classified by the pore diameter, with micropores having diameters less than 2 nm, mesopores having diameters between 2 and 50 nm, and macropores having pore diameters larger than 50 nm, so all the cross-linked aerogels have mesoporous structures.

Figure 6:
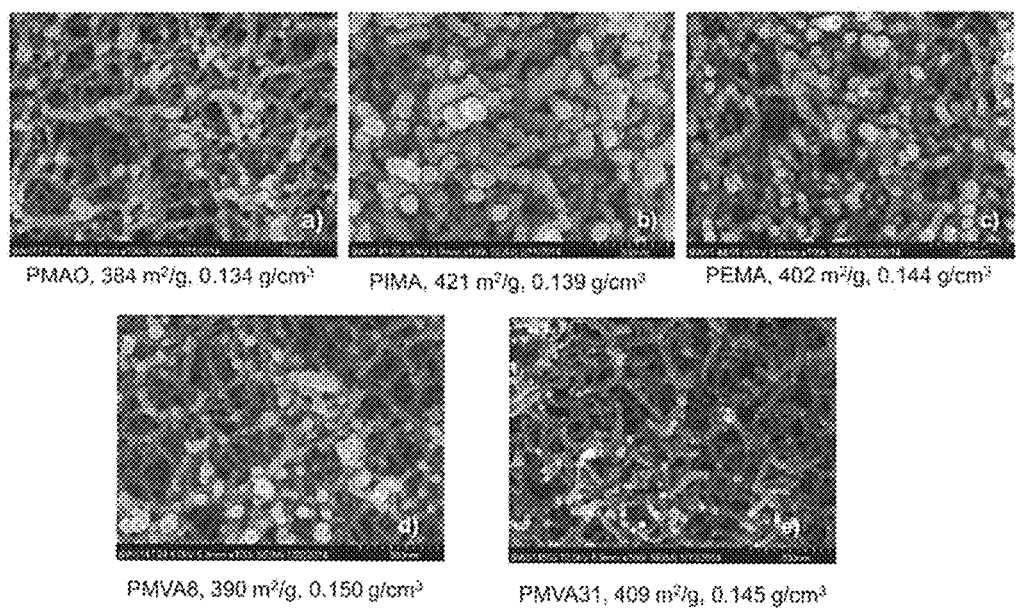
FIG. 6 shows a scanning electron microscopy of samples made with ODA in accordance with an embodiment.

Images 600 of FIG. 6 are scanning electron microscopy (SEM) images of the samples made 10 w/w %, n=20, ODA and with different cross-linkers. All the cross-linked samples have network formed by polymer fibers. The polymer fibers of PIMA cross-linked samples are shorter, bigger in diameters, and more densely packed structure compared to other samples. Poly(maleic anhydride)s cross-linked aerogels show similar microstructure to other TAB, OAPS or BTC cross-linked polyimide aerogels.

Figure 7:
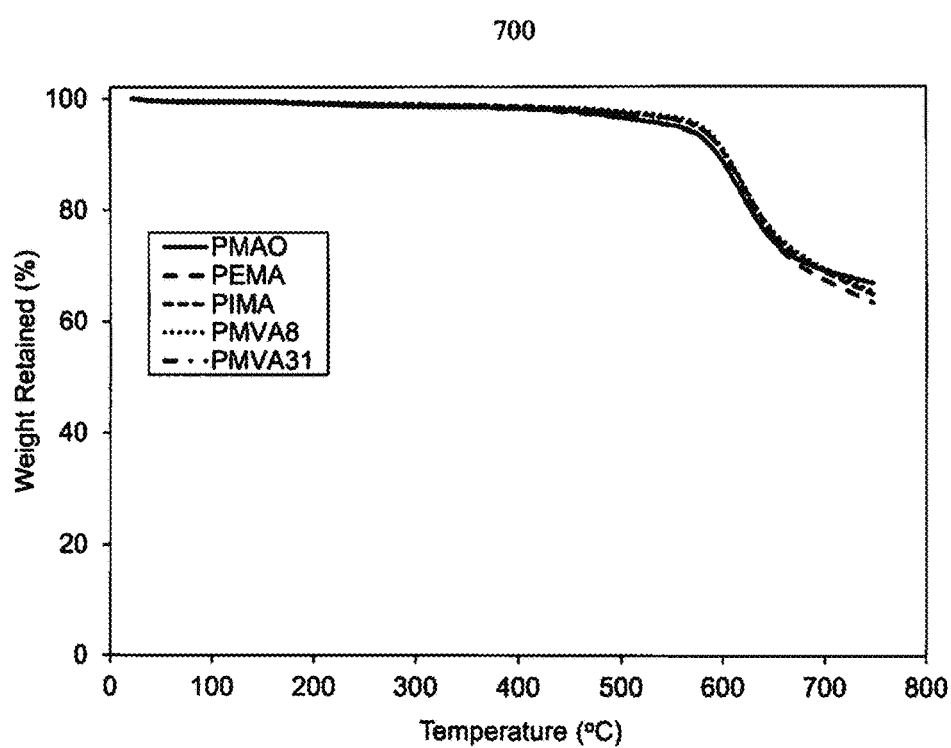
FIG. 7 shows TGA graphs for five different cross-linked aerogels of and formed in accordance with some embodiments.

Thermal gravimetric analyses (TGA) of the polyimide aerogels made with the various cross-linkers were measured in nitrogen from room temperature to 750° C. A Graph 700 of TGA curves of the five cross-linked aerogels is shown in FIG. 7. The onset of decomposition temperature at 606° C. is determined by the polyimide oligomer structure, not affected much by the cross-linkers. Due to the little amount of cross-linkers, the weight loss due to cross-linkers is not significant. All formulations have very little weight lost around 200° C., which indicate that imidization is completed and NMP is removed completely by exchanging solvent to acetone and supercritical drying. All samples have char yield above 60%.

Figure 8A:
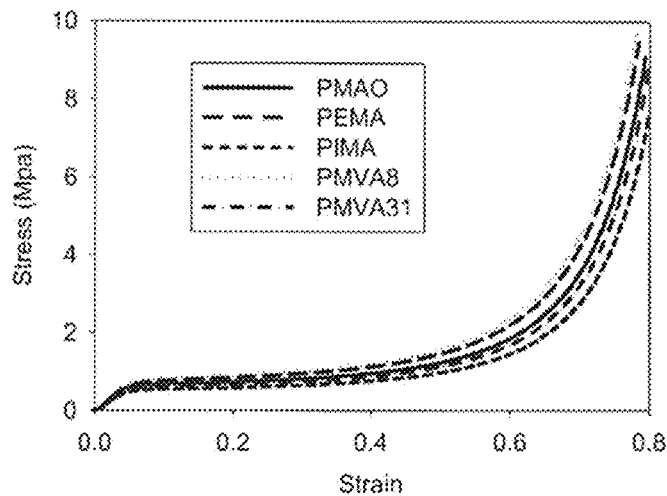
FIG. 8A shows stress-strain curves for cross-linked aerogels of and formed in accordance with some embodiments.
Figure 8B:
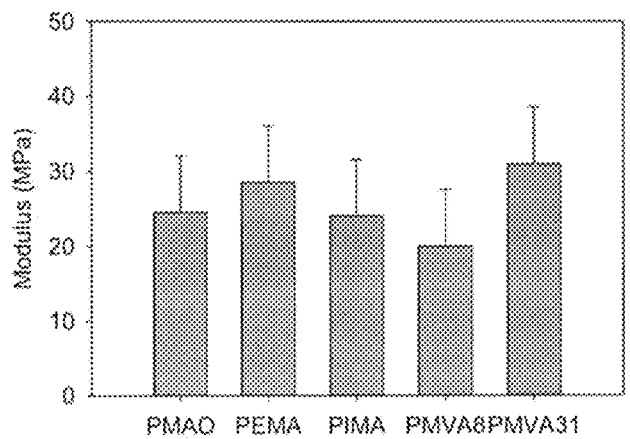
FIG. 8B shows Young's moduli data for the five different cross-linked aerogels of and formed in accordance with some embodiments.

Compression tests were performed on the cross-linked aerogels. All the samples were compressed to 80% strain. Typical stress-strain curves of the cross-linked aerogels are shown in graph 800 of FIG. 8A. The Young's moduli (standard deviation=7.52 MPa) of the samples vary from 15 MPa to 39 MPa, as shown in graph 810 of FIG. 8B. The p value (0.74) of the Young's modulus, as analyzed by ANOVA, is bigger than the α value (0.1) and F observed value (0.50) is smaller than the F critical value (3.52), thus there may be no significant difference in modulus due to cross-linker over and above standard error. The aerogels have similar moduli than, for example, TAB, OAPS, or BTC cross-linked polyimide aerogels at the same density.

Among the aerogels made according to processes of embodiments using five different cross-linkers, PIMA and PMAO cross-linked aerogels have significantly lower density, shrinkage, and porosity while they have no significant difference in surface area and modulus from the aerogels made with PEMA, PMVA8, and PMVA31, thus PIMA and PMAO are better substitute cross-linkers.

Example 2

Poly(amic acid) oligomer was formulated in NMP using a total molar ratio of daimines to BPDA of (n+1) to n, which is formulated to provide oligomers with an average of n repeat units terminated with anhydride, as shown in Table 3. Various poly(maleic anhydride)s were used to react with the terminal groups on the poly(amic acid) oligomers. The mole percent of rigid diamine, DMBZ, in place of ODA ranges from 0 to 100% in this study. A PIMA cross-linked sample procedure for an oligomer (n=25) made with 50% ODA and 50% DMBZ with total polymer 10 w/w % is as follows: to a stirred solution of DMBZ (0.9218 g, 4.34 mmol) and ODA (0.8694 g, 4.34 mmol) in 33 mL NMP was added BPDA (2.4567, 8.35 mmol). The mixture was stirred until all BPDA was dissolved, and a solution of PIMA (0.1035 g, 0.017 mmol) in 2.405 mL NMP was added. The resulting solution was stirred for 15 minutes, after which acetic anhydride (6.555 mL, 69.4 mmol) and then TEA (2.420 mL, 17.4 mmol) were added. Acetic anhydride to BPDA is formulated in the ratios 8:1. The ratio of TEA to BPDA is 2:1.

The solution was continually stirred for 10 minutes and then poured into a 20 mL syringe mold (2 cm in diameter), prepared by cutting off the needle end of the syringe and extending the plunger all the way out. The gels which formed within 30 minutes were aged in the mold for one day before extracting into 75% NMP and 25% acetone to soak for 24 hours to remove acetic acid and TEA. The solvent within the gels was then exchanged in 24 hour intervals to 25% NMP and 75% acetone, and then 100% acetone three times.

The gels were then placed in a supercritical fluid extraction chamber in acetone, and washed with liquid $CO_2$ then heated to 45° C. and the $CO_2$ was converted into a supercritical state and gaseous $CO_2$ was slowly vented out. The resulted aerogel was further vacuum dried at 75° C. overnight. The dry aerogels produced in this way have a density of 0.138 g/cm$^3$ and porosity of 89.8%. FTIR (cm$^{-1}$): 1774, 1718, 1618, 1500, 1440, 1417, 1367, 1308, 1288, 1242, 1172, 1115, 1088, 1010, 879, 829, 781, 763, 737, 706.

For the samples shown in Tables 3-5 experimental design analysis was conducted using Design Expert Version 8.1™, available from Stat-Ease, Inc., Minneapolis, Minn. Multiple linear regression analysis was used to derive empirical models to describe the effect of each of the process variables studied on measured properties. A full quadratic model including all main effects, second-order effects and all two way interactions was entertained, and continuous variables were orthogonalized (transformed to −1 to +1 scale) before analysis. Terms deemed to not be significant in the model (<90% confidence) were eliminated one at a time using a backward stepwise regression technique.

Figure 9:
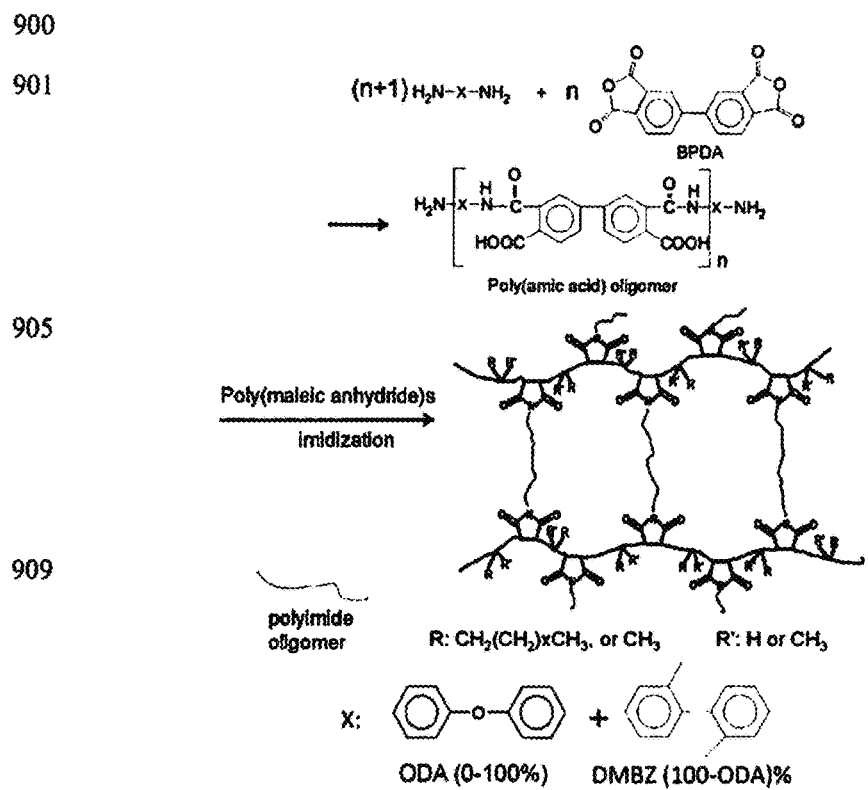
FIG. 9 shows a process for forming polyimide aerogel having poly(maleic anhydride) cross-links in accordance with an embodiment of the present invention.

The polyimide backbone may be formed with a mixture of diamines, as shown in process 900 of FIG. 9. For example, FIG. 9 shows a process 900 where n+1 diamine and n dianhydride are combined at 901 to form amine capped poly(amic acid)ide oligomers. Poly(maleic anhydride) is added at 905 to cross-link the poly(amic acid) oligomers, and then the cross-linked poly(amic acid)s are imidized. At 909, a gel is formed.

Table 3 shows the formulations and properties of polyimide aerogels (10 w/w %) cross-linked by various poly (maleic anhydride) and with different n.

| n | % ODA | cross-linker | Density (g/cm3) | Shrinkage (%) | Porosity (%) | Surface area (m2/g) | Contact Angle (°) |
|---|---|---|---|---|---|---|---|
| 25 | 50 | PEMA | 0.148 | 18.6 | 89.4 | 430.6 | 81.4 |
| 25 | 50 | PMAO | 0.144 | 18.7 | 89.3 | 469.9 | 79 |
| 25 | 50 | PEMA | 0.149 | 18.6 | 89.3 | 426.4 | 80.8 |
| 25 | 50 | PIMA | 0.138 | 15.9 | 89.8 | 441.5 | 103 |
| 30 | 50 | PMAO | 0.156 | 20.4 | 89 | 447.3 | 80.8 |
| 25 | 100 | PEMA | 0.164 | 21.1 | 89.3 | 369.6 | 78.7 |
| 25 | 50 | PMAO | 0.154 | 20.9 | 88.9 | 475.2 | 81.5 |
| 25 | 50 | PIMA | 0.149 | 18.3 | 89.4 | 447.6 | 111.3 |
| 30 | 0 | PIMA | 0.137 | 16 | 90 | 525.5 | 83.2 |
| 25 | 100 | PMAO | 0.153 | 20.4 | 89.9 | 377.1 | 85.8 |
| 20 | 100 | PMAO | 0.142 | 18.8 | 90.6 | 395.3 | 79.3 |
| 30 | 100 | PIMA | 0.163 | 21 | 89.9 | 373.3 | 82 |
| 25 | 0 | PEMA | 0.132 | 14.8 | 90.3 | 507.2 | 85.6 |
| 25 | 0 | PIMA | 0.127 | 15 | 90.7 | 529 | 83.9 |
| 20 | 50 | PIMA | 0.134 | 15.7 | 90.3 | 473.5 | 69.1 |
| 20 | 100 | PEMA | 0.155 | 19.5 | 89.9 | 362.3 | 76.9 |
| 25 | 50 | PMAO | 0.155 | 17.6 | 88.8 | 450.2 | 93.3 |
| 20 | 100 | PIMA | 0.145 | 18.1 | 90.3 | 404.6 | 80.1 |
| 20 | 0 | PIMA | 0.119 | 12.6 | 91.3 | 540.2 | 85.8 |
| 25 | 50 | PEMA | 0.160 | 20.3 | 88.4 | 403.8 | 84.2 |
| 25 | 0 | PMAO | 0.121 | 13.4 | 91.2 | 521.6 | 93.3 |
| 30 | 0 | PMAO | 0.126 | 14.8 | 90.4 | 498.6 | 80 |
| 30 | 100 | PEMA | 0.164 | 20.6 | 89.5 | 377.9 | 80.4 |
| 20 | 0 | PEMA | 0.125 | 13.2 | 91.2 | 554.5 | 88.4 |
| 25 | 100 | PIMA | 0.156 | 19.9 | 89.8 | 397.1 | 78 |
| 20 | 50 | PMAO | 0.129 | 15.9 | 90.6 | 471.8 | 80.6 |
| 25 | 50 | PEMA | 0.143 | 17.1 | 89.6 | 430.4 | 77.8 |
| 20 | 50 | PEMA | 0.128 | 14.5 | 90.5 | 479.6 | 81.6 |
| 30 | 50 | PEMA | 0.164 | 21.4 | 88.1 | 378.9 | 85.3 |
| 25 | 50 | PIMA | 0.136 | 15.7 | 90.2 | 487.63 | 72 |
| 25 | 50 | PIMA | 0.144 | 17.9 | 89.8 | 444.8 | 75.5 |
| 30 | 50 | PIMA | 0.156 | 20 | 88.3 | 421.4 | 79.4 |
| 25 | 50 | PMAO | 0.153 | 20 | 89 | 450 | 78.8 |
| 30 | 100 | PMAO | 0.164 | 21.9 | 90.2 | 363.4 | 77.2 |
| 20 | 0 | PMAO | 0.119 | 13.6 | 91.4 | 515 | 87.3 |
| 30 | 0 | PEMA | 0.146 | 17.5 | 89.5 | 511.2 | 84.3 |

The polyimide backbones are made with BPDA and ODA or DMBZ or combinations of ODA and DMBZ. (ODA ranged from 0-100 mol %, with DMBZ=(100−ODA) mol %).

Graphs 1000, 1010, and 1020 of FIGS. 10A, 10B, and 10C show empirical models of density, shrinkage, and porosity of the aerogels after supercritical drying and vacuum drying at 75° C. The densities ($R^2$=0.85, standard deviation=0.0058 g/cm$^3$) of the samples ranged from 0.119 g/cm$^3$ to 0.164 g/cm$^3$, as shown in FIG. 10A The samples shrink about 13.2 to 21.9% ($R^2$=0.81, standard deviation=1.21), as shown in FIG. 10B. The porosities of the samples are in the range of 88.3-91.4% ($R^2$=0.83, standard deviation=0.38), as shown in FIG. 10C. With increasing n, density and shrinkage increase while porosity decreases. As with other reported TAB, OAPS or BTC cross-linkers, the aerogels made with ODA shrink more than the aerogels made with DMBZ. Decreasing ODA %, the density and shrinkage also decrease. Shrinkage was not affected by cross-linkers. The PEMA cross-linked aerogels have the highest density and the lowest porosity, while PMAO and PIMA cross-linked aerogels have similar density and porosity. All the cross-linked aerogels made with ODA have lower densities than the TAB cross-linked aerogels made with ODA (0.19 to 0.20 g/cm$^3$ for 10 w/w % solution) and within the same range (0.14 to 0.176 g/cm$^3$) of the OAPS and BTC cross-linked aerogels made with ODA. The cross-linked aerogels made with DMBZ have higher densities (0.12-0.14 g/cm$^3$) than OAPS cross-linked aerogels, but in between BTC cross-linked aerogels (0.10-0.12 g/cm$^3$) and TAB cross-linked aerogels (0.13-0.15 g/cm$^3$).

Figure 11:
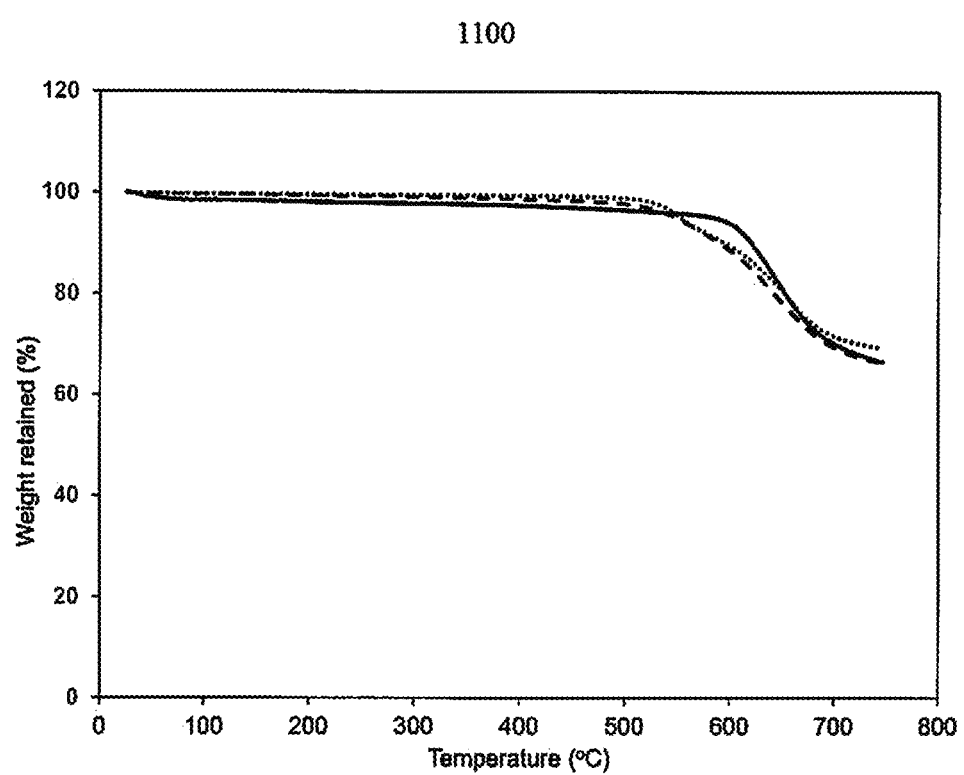
FIG. 11 shows TGA of polyimide aerogels made with the various cross-linkers in accordance with some embodiments.

Thermal gravimetric analyses (TGA) of the polyimide aerogels made with the various cross-linkers were measured in nitrogen from room temperature to 750° C. The TGA curves in $N_2$ of PIMA cross-linked aerogels made with 10 w/w %, n=25, ODA, 50% ODA+50% DMBZ, and DMBZ are shown in graph 1100 of FIG. 11. The onset decomposition temperatures change with the polyimide backbone structures. Similar to other aerogel cross-linked with TAB, OAPS or BTC, aerogels made with ODA have the highest onset of decomposition temperature.

All the cross-linked samples have high char yield above 60%. Because the cross-linker has less amount than diamines and dianhydrides, the weight loss due to cross-linker is not easily observed. All formulations have little weight loss around 200° C., which indicates that imidization is completed and NMP is removed completely by exchanging solvent to acetone and supercritical drying.

Figure 12A:
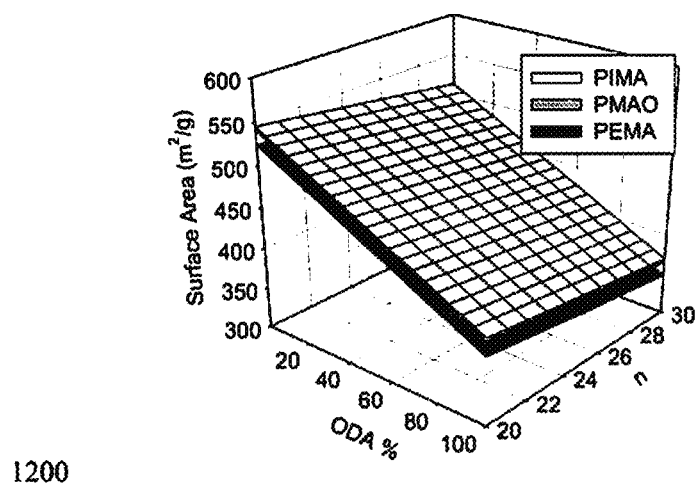
FIG. 12A shows the empirical model of the surface areas ($R^2$=0.91, standard deviation=18.00 m$^2$/g) of the cross-linked aerogels.

As seen from Graph 1200 of FIG. 12A, the empirical model of the surface areas ($R^2$=0.91, standard deviation=18.00 m$^2$/g) of the cross-linked aerogels are from 362.3 m$^2$/g to 554.5 m$^2$/g. The surface area increases with decreasing of ODA percentage and n value. All selected cross-linked aerogels made with BPDA/ODA have higher surface area than previous reported OAPS cross-linked polyimide aerogel, similar to the TAB cross-linked polyimide aerogels, a little lower than BTC cross-linked aerogels. The aerogels made with BPDA/DMBZ or BPDA/50% DMBZ+50% ODA are similar as the BTC cross-linked aerogels, but higher than OAPS and TAB cross-linked aerogels. PEMA cross-linked aerogels have lower surface area than PIMA and PMAO cross-linked aerogel, while PIMA and PMAO cross-linked aerogels have similar surface area.

Figure 12B:
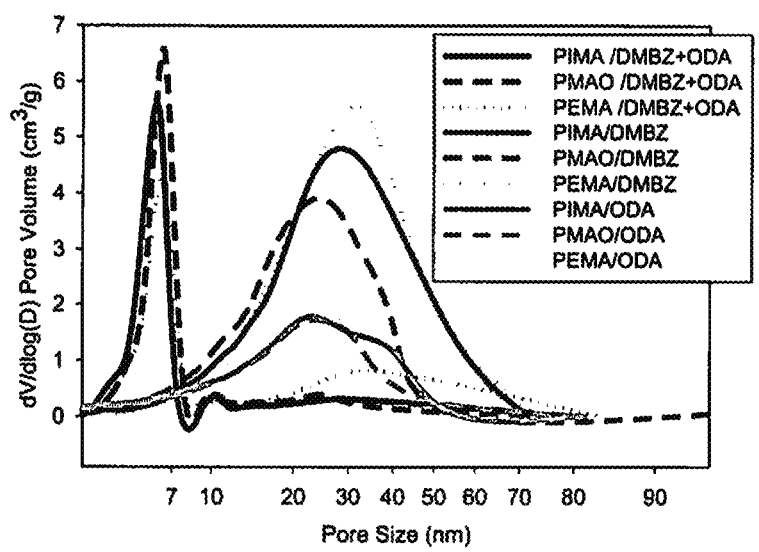
FIG. 12B shows the plot of pore volume vs pore size of various cross-linked aerogels at n=25 made with DMBZ, ODA, and 50% DMBZ+50% ODA.

According to IUPAC definition, pores are classified by the pore diameter, with micropores having diameters less than 2 nm, mesopores having diameters between 2 and 50 nm, and macropores having pore diameters larger than 50 nm. As seen from Graph 1210 of FIG. 12B, the plot of pore volume vs pore diameter of the aerogels, shows that the cross-linked aerogels have mesoporous structures. The major pore size distribution of aerogels made with DMBZ or ODA only are in the range of 23-28 nm. However, as seen from BTC cross-linked aerogels made with 50% DMBZ+50% ODA, sharp pore size distribution peaks around 6 nm were observed.

Figure 13:
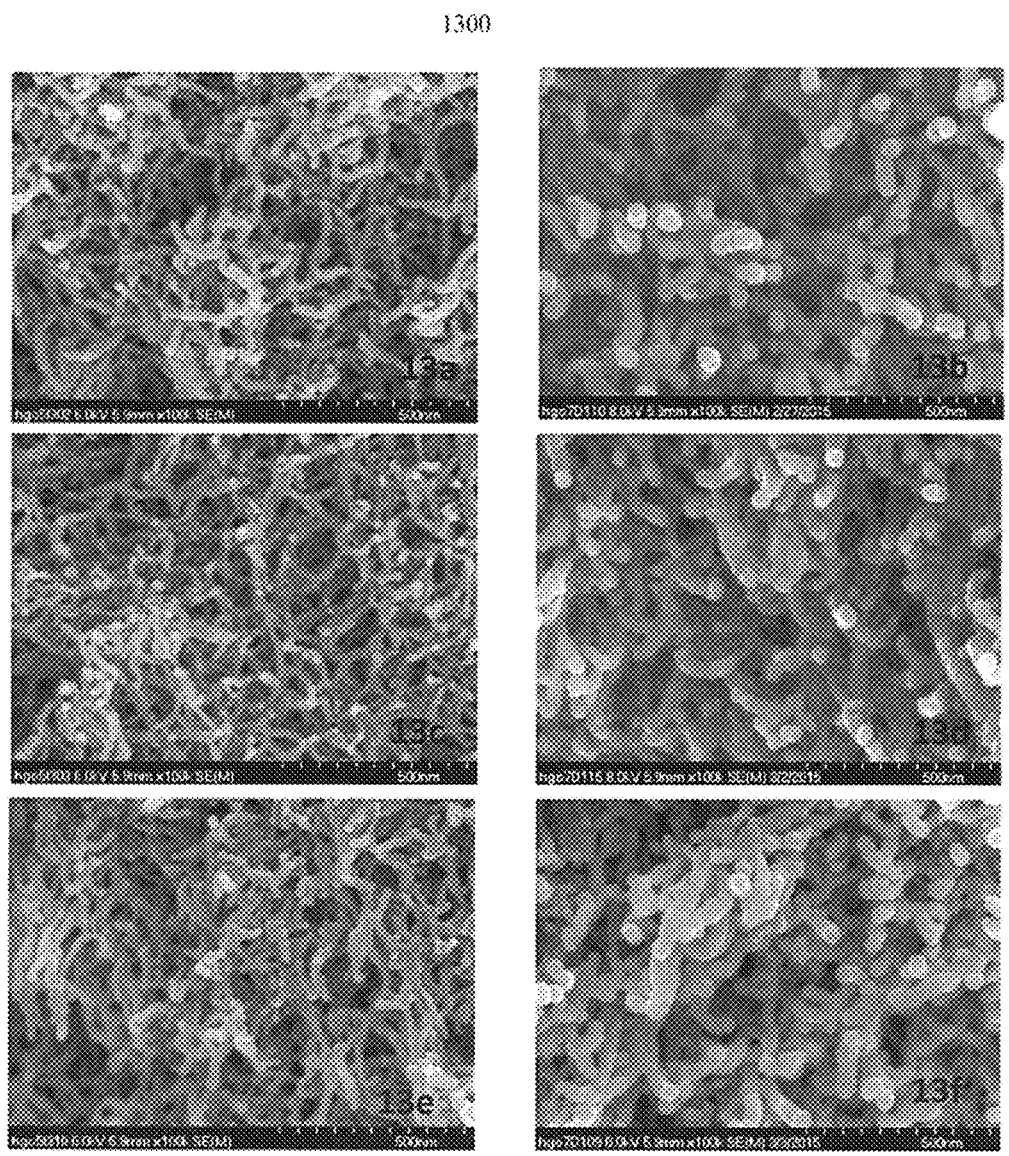
FIGS. 13A-13F show scanning electron microscopy of samples made with ODA or DMBZ using PIMA (13A and 13B), PMAO (13C and 13D), and PEMA (13E and 13F) as cross-linkers.

Graph 1300 of FIG. 13 shows the SEM images of representative cross-linked aerogels in the study made with ODA or DMBZ. Similar to other polyimide aerogels previously reported made with TAB, OAPS, or BTC cross-linkers, the aerogels have a fibrous network structure. However, unlike other kind cross-linked polyimide aerogels, no matter what poly(maleic anhydride) cross-linkers were used, the DMBZ 1310, 1330, 1350 containing formulations (FIG. 13b, 13d, and FIG. 13f) had strands with larger diameters than those derived from ODA 1300, 1320, 1330 alone (FIGS. 13a, 13c, and 13e).

Figure 14:
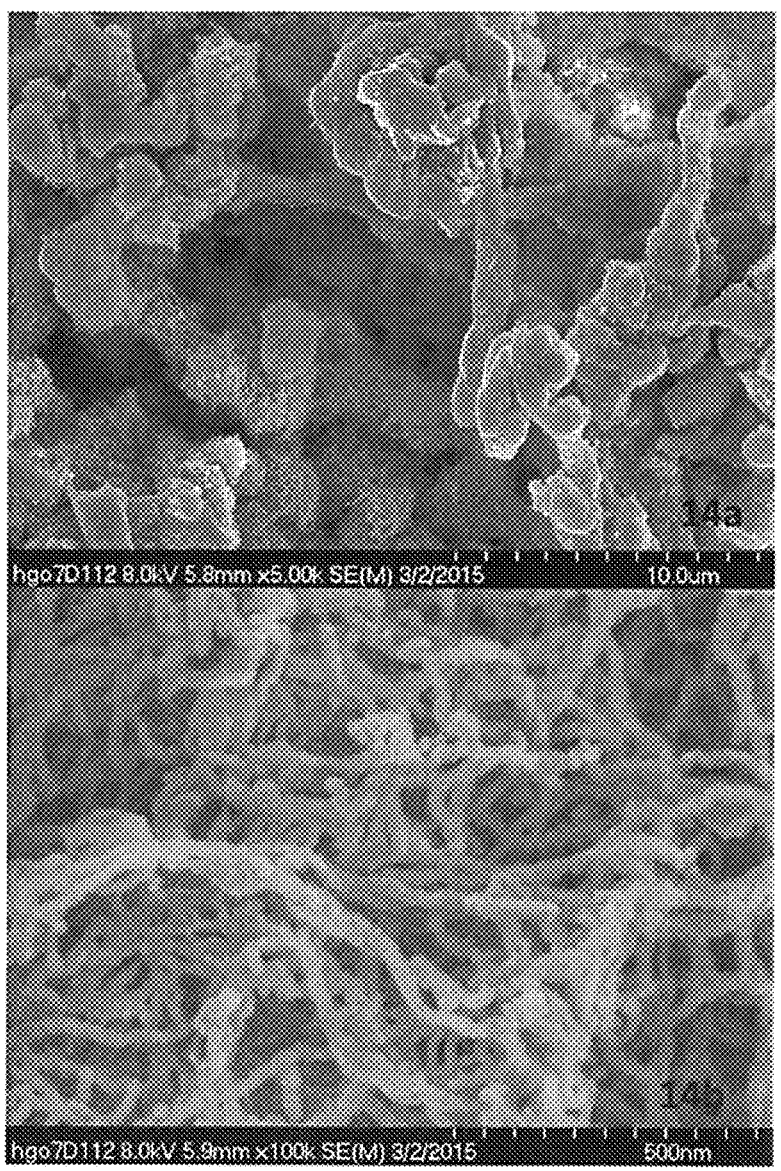
FIG. 14A and FIG. 14B show SEM images of PMAO cross-linked aerogel made with 50% DMBZ+50% ODA.

Graph 1400 of FIG. 14A and graph 1410 of FIG. 14A show SEM images of DMBZ/ODA aerogel cross-linked with PMAO. The aerogels made using 50% DMBZ+50% ODA looked very different from the aerogels made with DMBZ or ODA only. At lower magnification, the aerogels made with 50% DMBZ+50% ODA display spherical balls, which are connecting together and made with polymer strands. This is similar to the morphology seen with previously reported BTC cross-linked polyimide aerogels or polyimide aerogels containing a mixture of fluorinated and nonfluorinated monomers which was attributed to macroscale phase separation during gelation.

Figure 15:
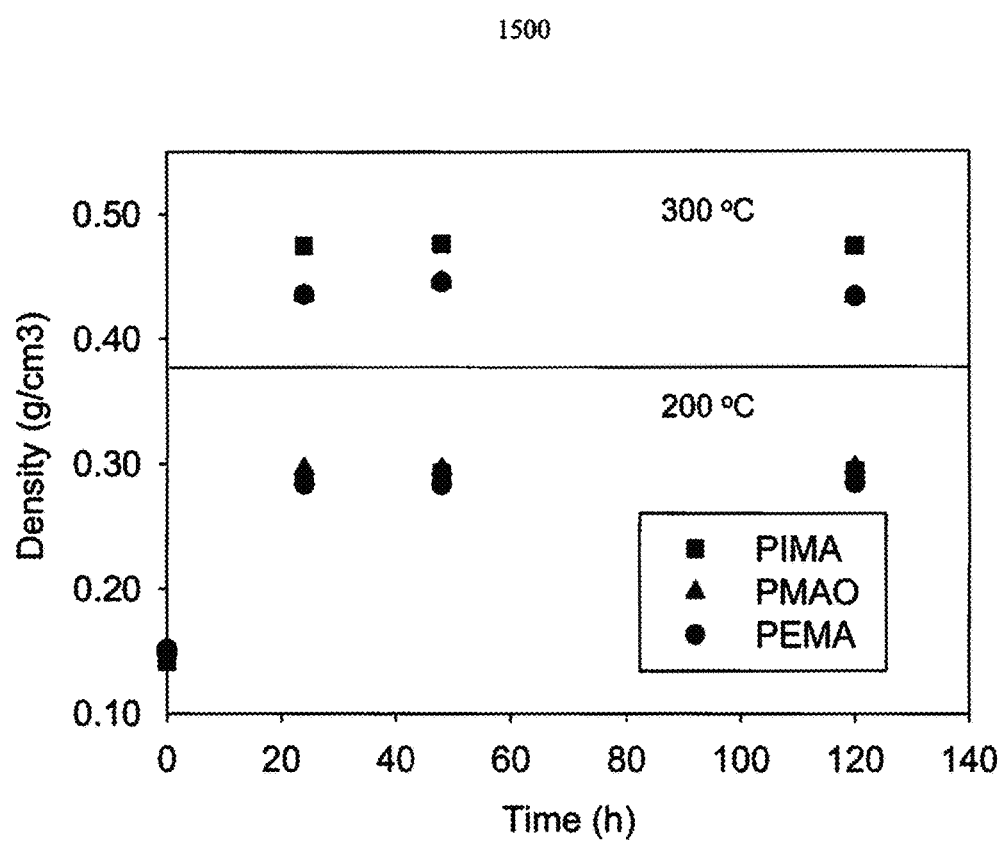
FIG. 15 shows the density change of the selected cross-linked polyimide aerogels made with 50% DMBZ+50% ODA aging at 200° C. and 300° C. for 24 h, 48 h and 100 h.

Graph 1500 of FIG. 15 shows the cross-linked polyimide aerogels made with 50% DMBZ+50% ODA and n=25, heat treated at 200° C. and 300° C. for 24 h, 48 h and 100 h separately. The obvious density change at a given temperature is during the initial 24 hours, and then the density tends to level off.

Figure 16A:
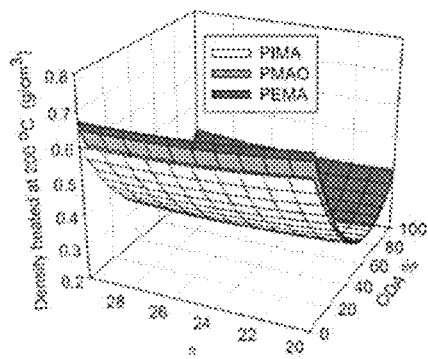
FIG. 16A and FIG. 16B show the empirical model of the density of the cross-linked polyimide aerogels heated at 200° C. and 300° C. for 24 h separately.
Figure 16B:
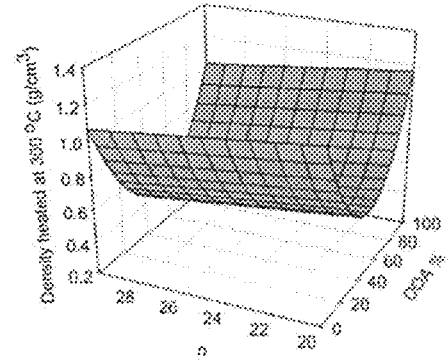

Graph 1600 of FIG. 16A shows the empirical model of the density of the cross-linked polyimide aerogels (standard deviation=0.016, $R^2$=0.99) after heated at 200° C. for 24 h. Same as observed in previous reported TAB, OAPS, or BTC cross-linked polyimide aerogels, the poly(maleic anhydride) cross-linked aerogels made with 50% DMBZ+50% ODA show lower density (0.28-0.30 g/cm) than ODA or DMBZ only, and also than TAB or BTC cross-linked aerogels (~0.40 g/cm) made with 50% DMBZ+50% ODA. The PIMA cross-linked polyimide aerogels made with ODA or DMBZ only have the lowest density among the poly(maleic anhydride) cross-linked aerogels made with ODA or DMBZ only. Graph 1610 of FIG. 16B is the empirical model of the density of the cross-linked polyimide aerogels (standard deviation=0.1, $R^2$=0.92) after heated at 300° C. for 24 h. The cross-linker is not a factor to affect the density change, which is due to the decomposition of the cross-linker. The density of poly(maleic anhydride) cross-linked aerogel made with 50% DMBZ+50% ODA after heat treatment at 300° C. is about 0.42-0.56 g/cm$^3$, which is a little lower than OAPS cross-linked aerogel (0.58-0.60 g/cm). The density after heated at 300° C. increases with n decreases.

Figure 16C:
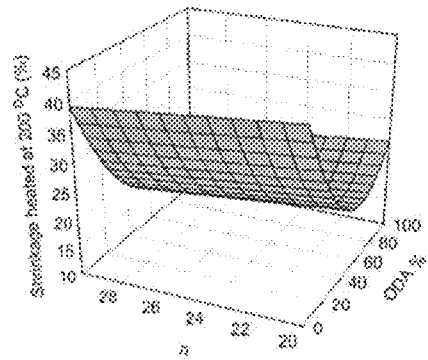
FIG. 16C and FIG. 16D show the empirical model of the shrinkage of the cross-linked polyimide aerogels heated at 200° C. and 300° C. for 24 h separately.
Figure 16D:
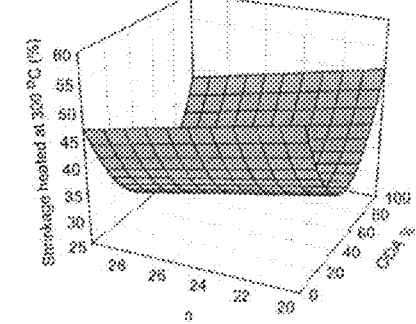

Graph 1620 of FIG. 16C and Graph 1630 of FIG. 16D show the empirical models of shrinkages (shrinkage compared to the samples at room temperature.) of the cross-linked polyimide aerogels at 200° C. (Standard deviation=2.06, $R^2$=0.96) and 300° C. (Standard deviation=4.48, $R^2$=0.83) separately. The shrinkages of the aerogel at the given temperature are not a function of the cross-linkers, but affected by the n and ODA %. The higher the n value, the lower the shrinkages are. The formulations made with 50% DMBZ+50% ODA show the lower shrinkages than the formulations made with ODA or DMBZ only, 17-20% at 200° C. and 27-34% at 300° C., similar to OAPS cross-linked polyimide aerogels.

Example 3

Poly(amic acid) oligomer was formulated in NMP using a molar ratio of total diamines to BPDA of (n+1) to n, which is formulated to provide oligomers with an average of n repeat units terminated with anhydride. The mole percent of diamine PPG (PPG-230 and PPG-400) in place of ODA ranges from 0 to 60 mol % in this study as shown in Tables 4-5. PMAO was used to react with the terminal diamine groups on the poly(amic acid) oligomers. The total weight of precursors in solution was formulated to be 8 to 12 w/w %. A PMAO cross-linked sample procedure for an oligomer (n=20) made using 30 mol % PPG-230 and 70 mol % ODA, total precursor weight is 10 w/w % is as follows: To a stirred solution of PPG-230 (0.51 ml, 2.10 mmol) and ODA (0.9831 g, 4.91 mmol) in 30 mL NMP was added BPDA (1.9654 g, 6.68 mmol). The mixture was stirred until all BPDA was dissolved, and a solution of PMAO (0.2338 g, 0.006 mmol) in 2.1 mL NMP was added. The resulting solution was stirred for 15 minutes, after which acetic anhydride (5.295 mL, 56.0 mmol) and then TEA (1.96 mL, 14.1 mmol) were added. Acetic anhydride to BPDA is formulated in the ratios 8:1. The ratio of TEA to BPDA is 1:1 or 2:1. The solution was continually stirred for 10 minutes and then poured into a 20 mL syringe mold (2 cm in diameter), prepared by cutting off the needle end of the syringe and extending the plunger all the way out. The gels which formed within 30 minutes were aged in the mold for one day before extracting into fresh NMP to soak for 24 hours to remove acetic acid and TEA. The solvent within the gels was then gradually exchanged to acetone in 24 hour intervals starting with 75% NMP in acetone, followed by 25% NMP in acetone and finally three more times with 100% acetone. The gels were then placed in a supercritical fluid extraction chamber in acetone, and washed with liquid $CO_2$ then the $CO_2$ was converted into a supercritical state and gaseous $CO_2$ was slowly vented out. The resulted aerogel was further vacuum dried at 75° C. overnight. The dry polyimide aerogels produced in this way have a density of 0.089 g/cm$^3$ and porosity of 94.0%. 13C CPMAS NMR (ppm): 166.3 ppm, 154.2 ppm, 143.2 ppm, 130 ppm, 125 ppm, 74.2 ppm, 55.3 ppm, 47.4 ppm, 30 ppm, 22 ppm, 18 ppm. FT-IR (cm-1): 1774, 1714, 1619, 1500, 1419, 1373, 1306, 1290, 1241, 1170, 1115, 1090, 1014, 941, 910, 879, 839, 739, 1244, 1170, 1116, 1093, 1014, 941, 910, 881, 839, 739.

The PIMA or PMAO cross-linked poly(amic acid) solution as described above was cast onto a PET carrier using a 12 inch wide Doctor blade at a speed of 80 cm/min. The gel film was peeled away from the carrier film. Afterwards, the films were washed in 24 hour intervals in 75% NMP in acetone, followed by 25% NMP in acetone and finally washed three more times with acetone. Supercritical drying was carried out to produce polyimide aerogel thin films.

Figure 17:
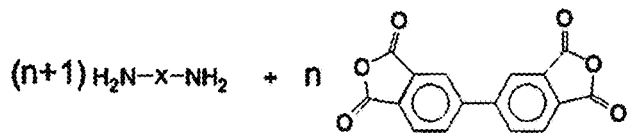
FIG. 17 shows a process for forming polyimide aerogel having poly(maleic anhydride) cross-links in accordance with an embodiment of the present invention.
Figure 17:
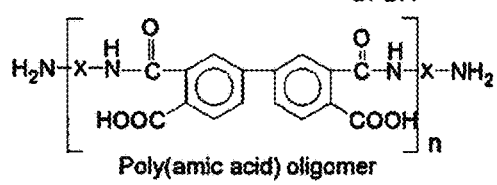
Figure 17:
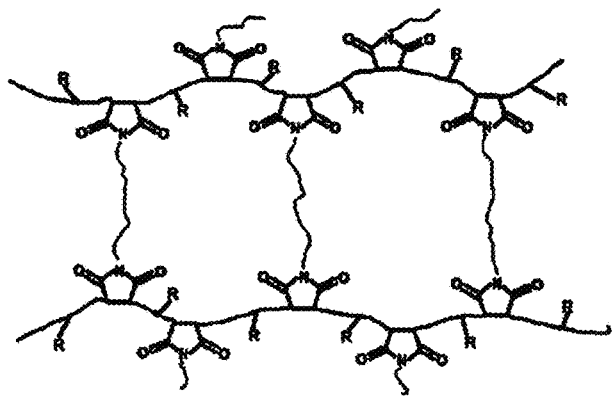
Figure 17:
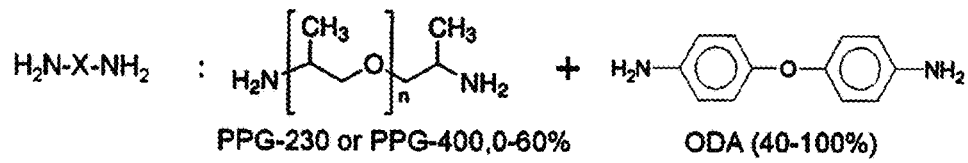

Synthesis of PMAO cross-linked aerogels made with ODA and PPG-230 or PPG-400 is shown in process 1700 of FIG. 17. In particular, FIG. 17 shows a process 1200 for forming polyimide gels in accordance with an embodiment. FIG. 17 shows adding n+1 diamine to n dianhydride at 1701. The poly(amic acid) oligomers may be cross-linked at 1705 using poly(maleic anhydride). Chemical imidization may be carried out at 1705 to form polyimide. At 1709, a gel is formed.

The diamines used for the polyimide oligomers may be ODA or combinations of PPG-230 and ODA or combinations of PPG-400 and ODA. PPG-230 or PPG-400 ranged from 0-30 mol % and ODA ranged from (100-PPG) mol %. In a pre-scanning study, it is noticed that the highest mol percentage of PPG-230 is 80 mol % when n=25 and total precursor is 10 w/w %. At n=5, PPG-230 of 60 mol %, gelation could not happen even at 12 w/w %. If a ratio of TEA to BPDA is 1 to 1, most of the gels easily break and do not survive processing intact. For example, a formulation with 8 w/w % total precursor, n=10, and 60 mol % PPG-230 at TEA:BPDA=1:1 takes longer time to gel and the aerogel comes out as broken pieces, but the aerogel with the same amount of precursor, n and PPG-230 percentage, but TEA:BPDA=2:1, is a whole piece. It is necessary to increase the ratio of TEA to BPDA to 2:1. Thus for the DOE of the tested examples as listed in Tables 4-5, n is in the range of 10-30, the percentage of PPG-230 or PPG-400 are 0-60 mol %, the total precursor in the range of 8-10 w/w %, and TEA:BPDA=2:1.

Table 4 shows experimental design data and properties of PMAO-cross-linked polyimide aerogel made with PPG-230 and/or ODA at TEA:BPDA=2:1

| run# | w/w % | n | PPG-230% | gel time (min) | Density (g/cm$^3$) | Shrinkage (%) | Porosity (%) | Surface Area (m$^2$/g) | Modulus (MPa) | Contact angle (°) |
|---|---|---|---|---|---|---|---|---|---|---|
| 1 | 8 | 10 | 60 | 19 | 0.056 | 7.6 | 96.1 | 318 | 6.3 | 98 |
| 2 | 12 | 20 | 30 | 14 | 0.097 | 7.5 | 93.4 | 369 | 11.1 | 86 |
| 3 | 10 | 20 | 30 | 15 | 0.089 | 9.0 | 94.0 | 414 | 9.0 | 91 |
| 4 | 10 | 20 | 30 | 15 | 0.085 | 7.8 | 94.3 | 374 | 9.5 | 95 |
| 5 | 8 | 20 | 30 | 19 | 0.060 | 5.9 | 95.9 | 407 | — | 94 |
| 6 | 10 | 20 | 30 | 16 | 0.090 | 9.2 | 93.9 | 407 | 7.4 | 94 |
| 7 | 10 | 20 | 0 | 11 | 0.134 | 17.1 | 91.2 | 384 | 29.6 | 0 |
| 8 | 10 | 20 | 30 | 12 | 0.085 | 7.4 | 94.3 | 396 | 7.9 | 99 |
| 9 | 10 | 20 | 60 | 19 | 0.080 | 9.0 | 94.3 | 276 | 11.4 | 124 |
| 10 | 10 | 10 | 30 | 18 | 0.063 | 4.9 | 95.8 | 397 | — | 109 |
| 11 | 12 | 30 | 60 | 19 | 0.067 | 7.2 | 95.2 | 273 | 7.8 | 109 |
| 12 | 12 | 30 | 0 | 8 | 0.165 | 20.3 | 89.1 | 364 | 23.6 | 0 |
| 13 | 8 | 30 | 0 | 16 | 0.120 | 22.4 | 91.7 | 415 | 11.5 | 0 |
| 14 | 12 | 10 | 60 | 16 | 0.066 | 7.1 | 95.3 | 292 | 6.7 | 119 |
| 15 | 10 | 30 | 30 | 14 | 0.077 | 6.0 | 94.8 | 397 | — | 103 |
| 16 | 12 | 10 | 0 | 10 | 0.125 | 13.9 | 91.6 | 379 | 42.6 | 0 |
| 17 | 8 | 10 | 0 | 23 | 0.092 | 15.6 | 94.0 | 453 | 14.1 | 0 |
| 18 | 8 | 30 | 60 | 30 | 0.040 | 7.1 | 97.3 | 286 | 1.9 | 114 |

Table 5 shows experimental design data and properties of the PMAO-cross-linked polyimide aerogel made with PPG-400 and/or ODA at TEA:BPDA=2:1:

| run# | w/w % | n | PPG-400 % | Density (g/cm$^3$) | Shrinkage (%) | Porosity (%) | Surface Area (m$^2$/g) | Contact angle (°) |
|---|---|---|---|---|---|---|---|---|
| 1 | 10 | 20 | 30 | 0.091 | 10.8 | 93.5 | 325 | 121 |
| 2 | 12 | 30 | 60 | 0.468 | 53.6 | 64.6 | 47 | 120 |
| 3 | 8 | 10 | 60 | 0.159 | 43.6 | 88.0 | 101 | 108 |
| 4 | 12 | 30 | 0 | 0.159 | 18.6 | 89.6 | 368 | 0 |

-continued

| run# | w/w % | n | PPG-400 % | Density (g/cm³) | Shrinkage (%) | Porosity (%) | Surface Area (m²/g) | Contact angle (°) |
|---|---|---|---|---|---|---|---|---|
| 5 | 10 | 20 | 30 | 0.101 | 13.6 | 92.8 | 303 | 110 |
| 6 | 10 | 20 | 60 | 0.326 | 49.2 | 75.4 | 72 | 90 |
| 7 | 8 | 20 | 30 | 0.064 | 10.9 | 95.3 | 322 | 121 |
| 8 | 10 | 20 | 30 | 0.083 | 10.8 | 94.0 | 299 | 109 |
| 9 | 12 | 10 | 60 | 0.293 | 59.0 | 78.3 | 67 | 95 |
| 10 | 10 | 20 | 0 | 0.133 | 19.1 | 91.4 | 36 | 0 |
| 11 | 12 | 20 | 30 | 0.106 | 11.5 | 92.3 | 318 | 113 |
| 12 | 10 | 30 | 30 | 0.087 | 9.6 | 93.9 | 332 | 115 |
| 13 | 10 | 10 | 30 | 0.064 | 6.9 | 95.4 | 343 | 116 |
| 14 | 12 | 10 | 0 | 0.123 | 13.6 | 91.8 | 434 | 0 |
| 15 | 8 | 10 | 0 | 0.090 | 14.4 | 93.8 | 452 | 0 |
| 16 | 8 | 30 | 60 | 0.236 | 54.4 | 82.4 | 85 | 105 |
| 17 | 8 | 30 | 0 | 0.128 | 22.6 | 91.2 | 392 | 0 |
| 18 | 10 | 20 | 30 | 0.092 | 11.0 | 93.8 | 339 | 126 |

Figure 18:
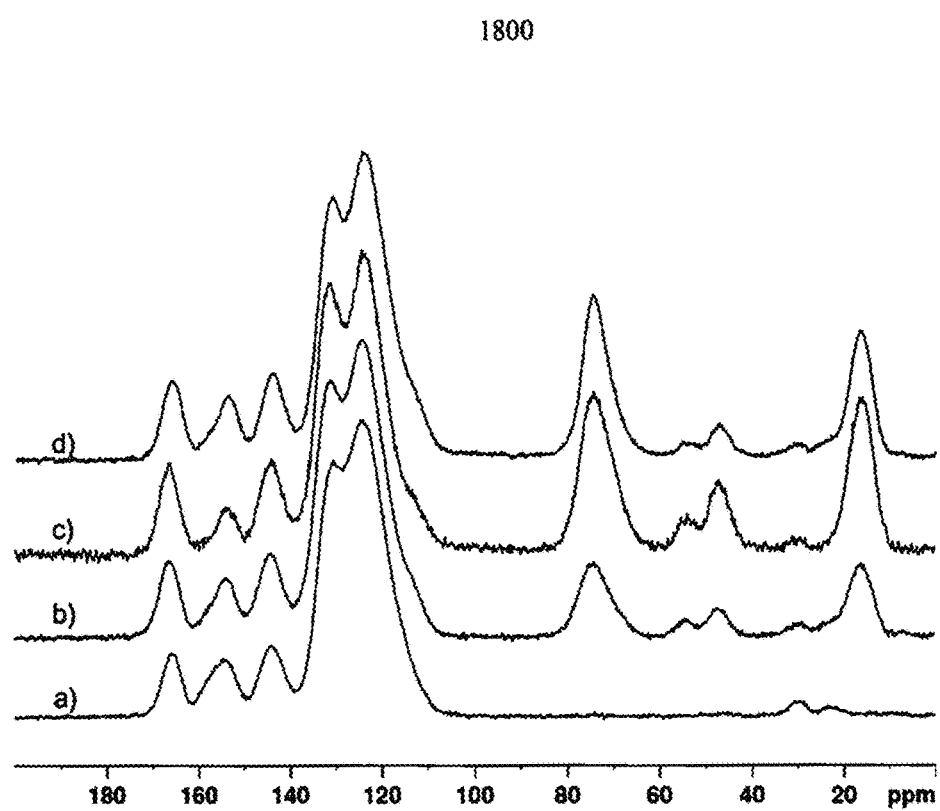
FIG. 18 shows $^{13}$C NMR spectra from solid samples of PMAO cross-linked polyimide aerogels made in accordance with some embodiments.

Graph 1800 of FIG. 18 shows $^{13}C$ NMR spectra from solid samples of PMAO cross-linked polyimide aerogels. All samples contain an imide carbonyl peak at approximately 166.3 ppm, and aromatic peaks between 115 ppm and 143.2 ppm. The peak at 154.2 ppm is corresponding to the aromatic ether carbon of ODA. NMR spectra of polyimide aerogels made with PPG (lines b, c, and d of FIG. 18) have a characteristic aliphatic peak at 18 ppm for the pendant methyl groups and an aliphatic ether carbon at 74.2 ppm, which increase with increasing PPG-230 content or PPG molecular weight. The peaks at 55.3 ppm and 47.4 ppm are due to the carbon close to the amine on PPG. The small peaks at 30 ppm and 22 ppm are attributed to the carbons on the cross-linker PMAO.

Figure 19A:
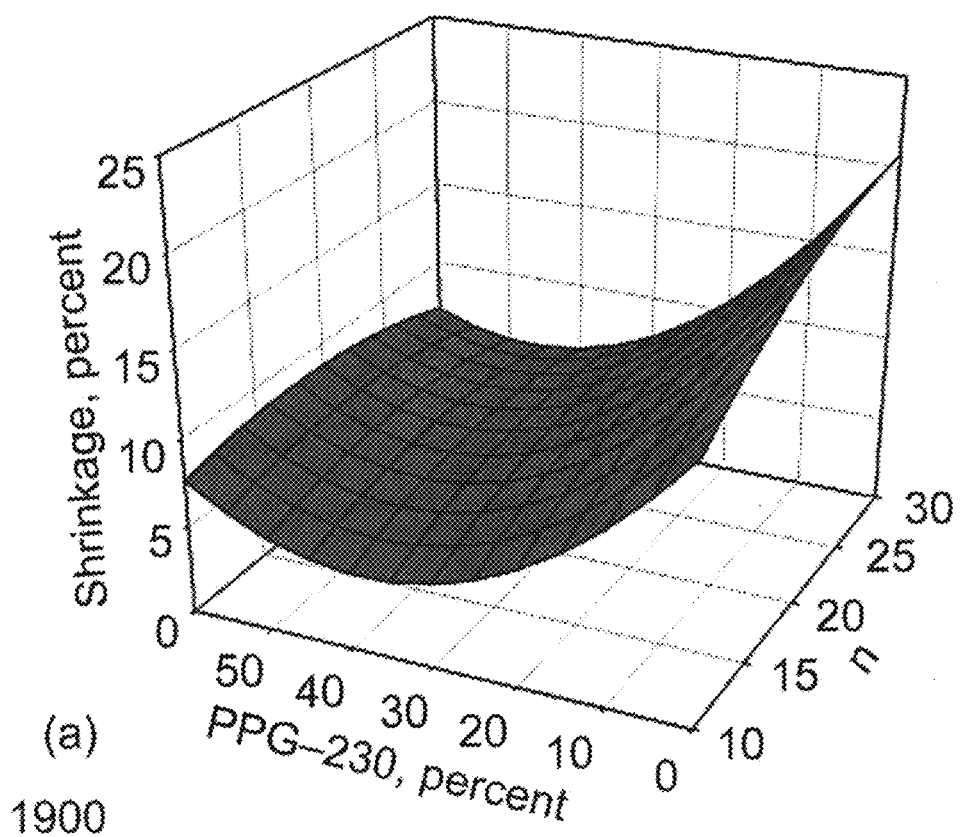
FIGS. 19A-19F show empirical models of shrinkage, density and porosity of the aerogels after supercritical drying and vacuum drying at 75° C., according to an embodiment of the present invention.
Figure 19B:
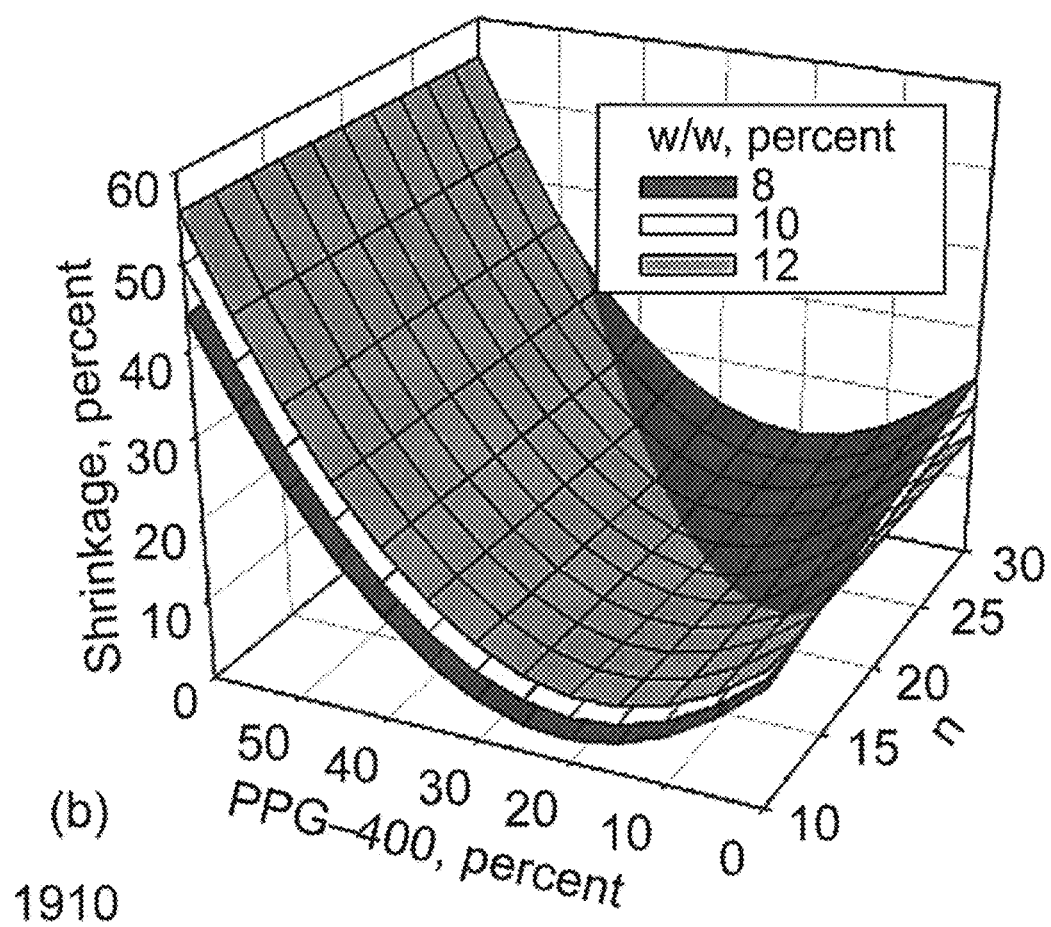
Figure 19C:
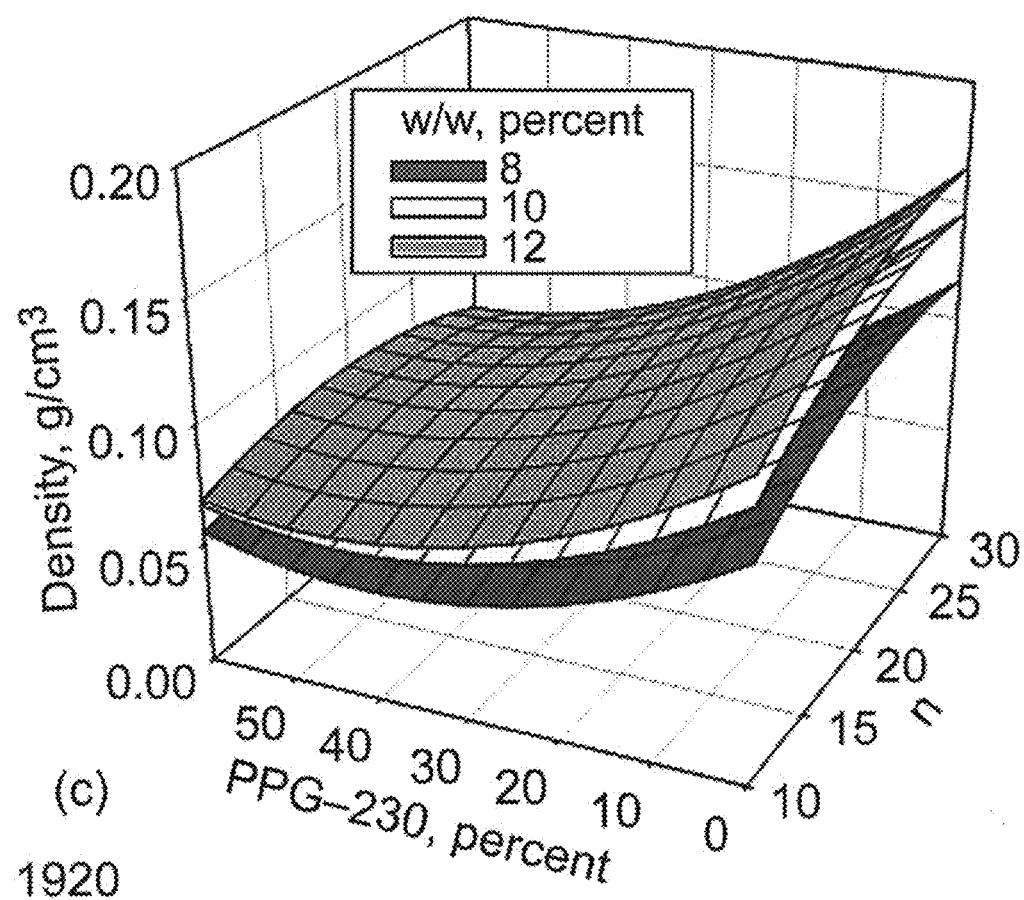
Figure 19D:
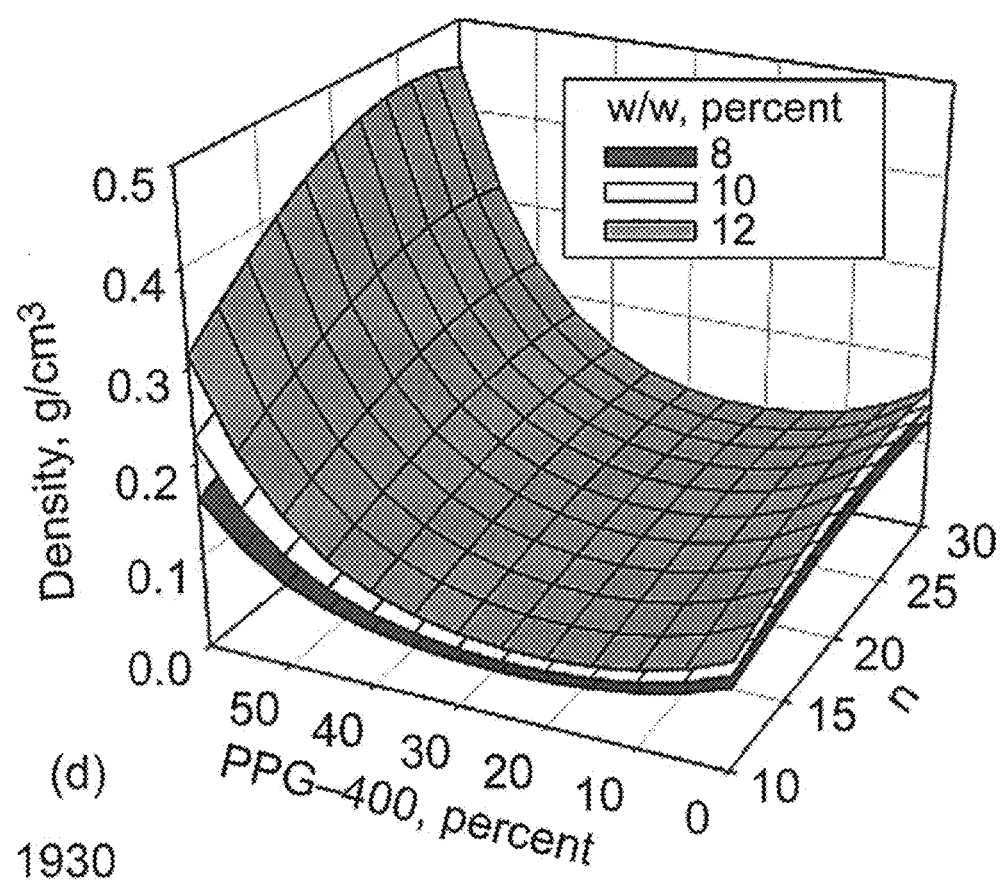
Figure 19E:
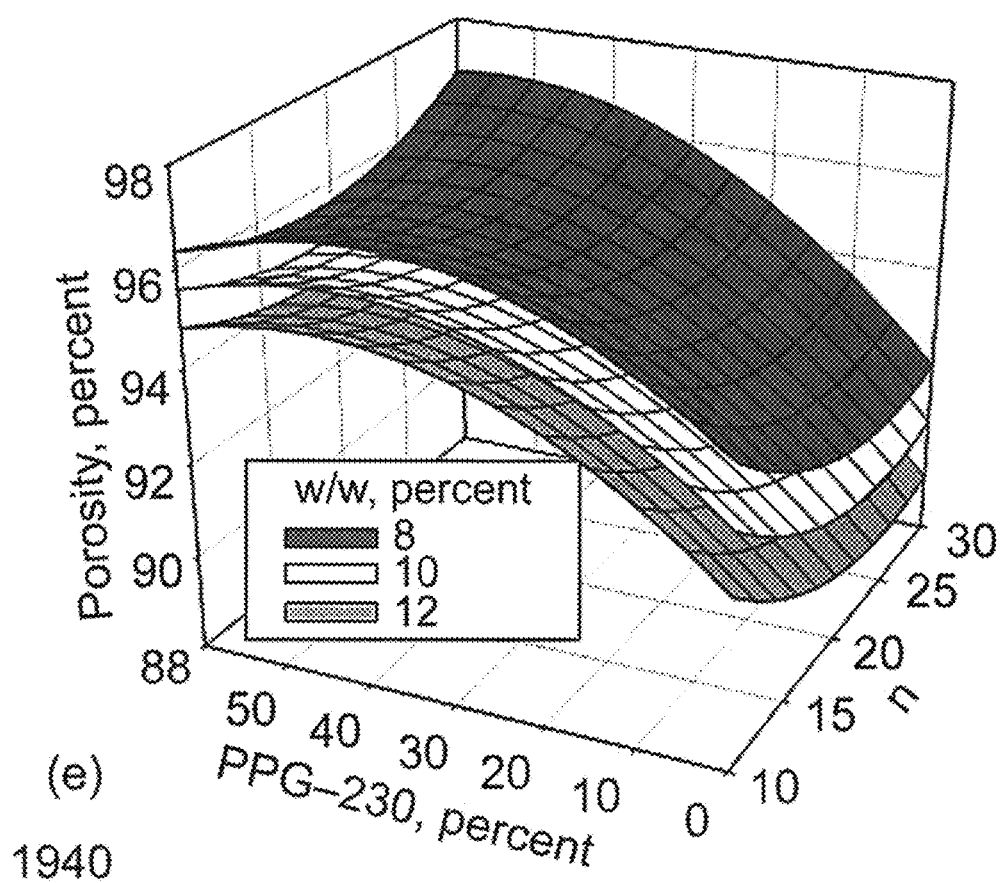
Figure 19F:
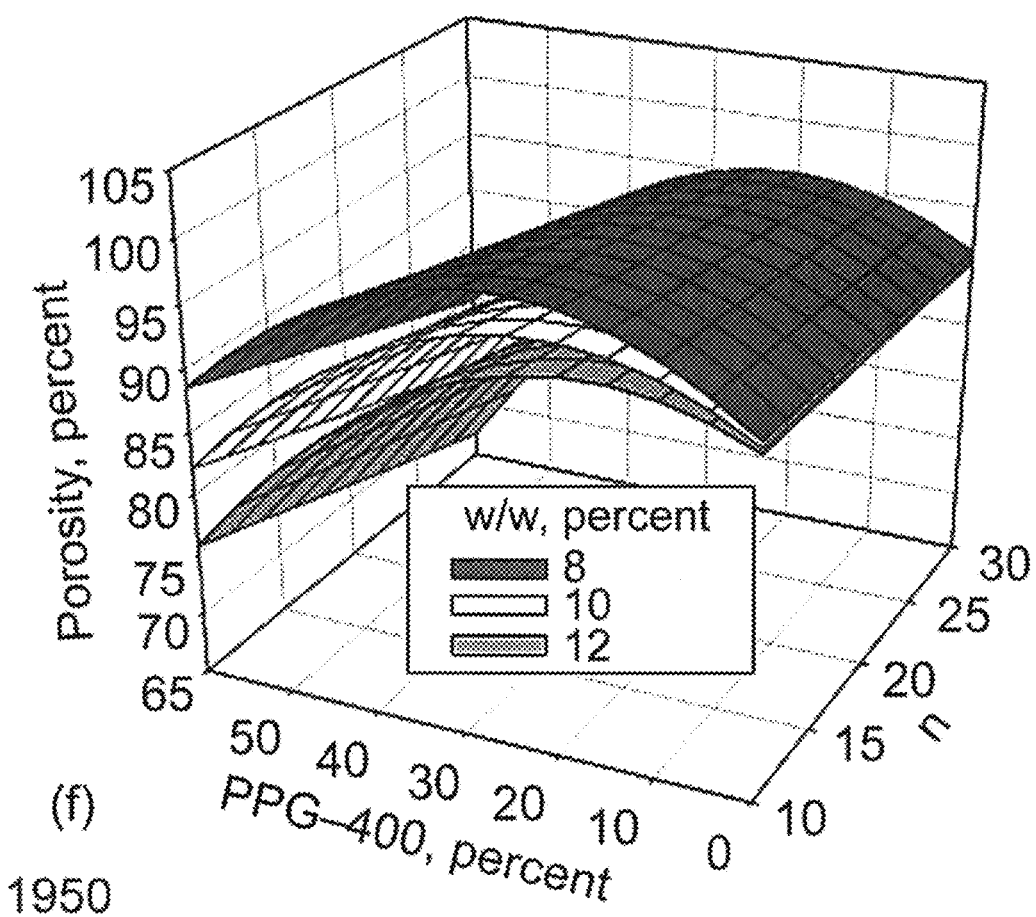

The properties of the PMAO aerogels made with PPG-230 and PPG-400 are listed in Table 4 and Table 5. Graphs 1900-1950 of FIGS. 19A-19F shows empirical models of shrinkage, density and porosity of the aerogels after supercritical drying and vacuum drying at 75° C. As seen in graph 1900 of FIG. 19A (PPG-230: $R^2=0.96$, Standard deviation=1.25), PPG-230 percentage and n affect the shrinkage of aerogels made with PPG-230, but the total precursor amount does not. The shrinkage reaches the minimum when PPG-230 is 40 mol %. The shrinkages of the aerogels made with PPG-400 ($R^2=0.99$, Standard deviation=2.43), seen in graph 1910 of FIG. 19B, are slightly affected by the total precursor weight and increase with n increases. At 20 mol % PPG-400, n=10, 8 w/w %, the shrinkage arrives the lowest point. Above 20 mol % PPG-400, increasing PPG-400 percentage significantly increases the shrinkage. At 60 mol % PPG-400, the shrinkage of the aerogels can reach to 60%. The densities (graph 1930 of FIG. 19C) of the aerogels made with PPG-230 (PPG-230:$R^2=0.99$, Standard deviation=0.004) vary from 0.04 g/cm³ to 0.165 g/cm³. The aerogels without PPG-230 have higher density than those with PPG-230. Increasing PPG-230 percentage and decreasing the n value, the densities of the aerogels decrease. As seen from graph 1940 of FIG. 19D, the aerogels made with PPG-400 have densities ($R^2=0.99$, Standard deviation=0.03 in log) from 0.064 g/cm³ to 0.468 g/cm³. The densities of the aerogels increase with increasing the total precursor weight. The aerogels made with 60 mol % PPG-400 show the highest density due to the highest shrinkage. The aerogels made with 30 mol % PPG-400, however, still have lower density than those without PPG-400. At higher PPG-400 percentage, total precursor amount and n value have more effect on the densities of the aerogels. Increasing n and total precursor amount, the densities of the aerogels made with PPG-400 also increase. Porosity of aerogel made with PPG-230 ($R^2=0.97$, Standard deviation=0.42, graph 1950 of FIG. 19E) exhibits the opposite trend to the density. Due to the high shrinkage and high density, the aerogels with 60 mol % PPG-400 have smaller porosities ($R^2=0.96$, Standard deviation=1.97, graph 1960 of FIG. 19F), especially at high total precursor weight.

Figure 20A:
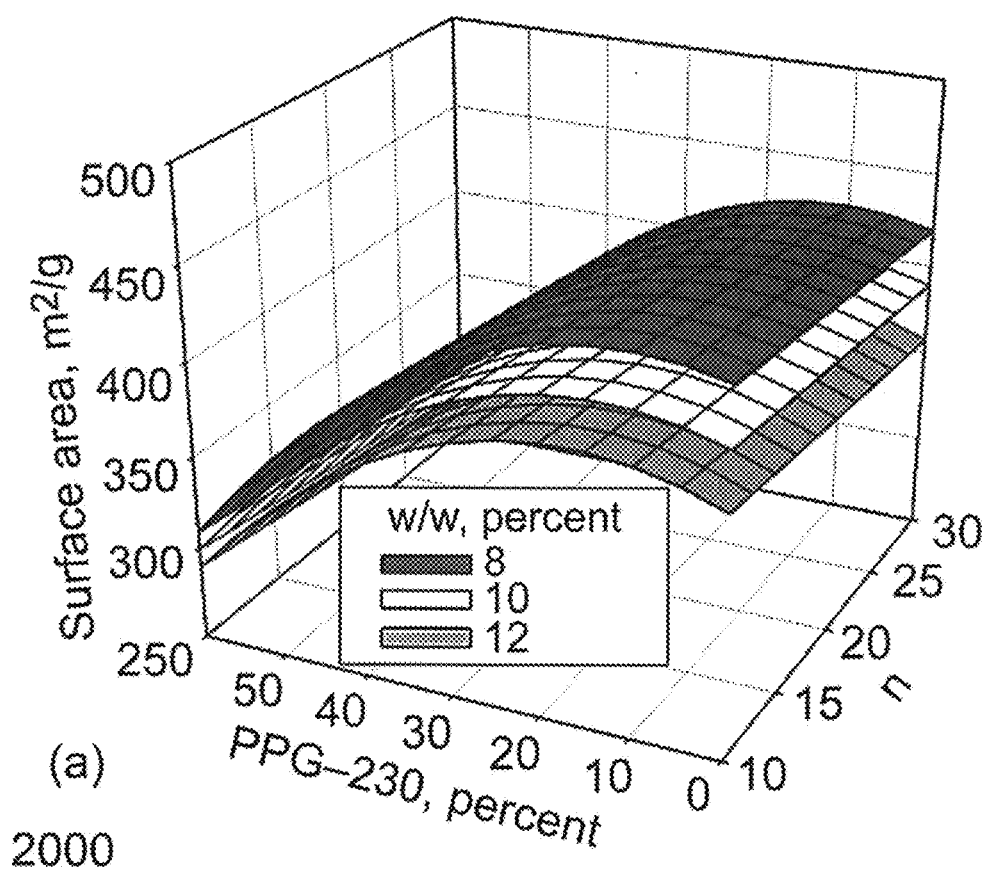
FIGS. 20A and 20B show an empirical model of surface area change of aerogels made with PPG (PPG-230% and PPG-400%, respectively) and/or ODA, and using PMAO as a cross-linker, according to an embodiment of the present invention.
Figure 20B:
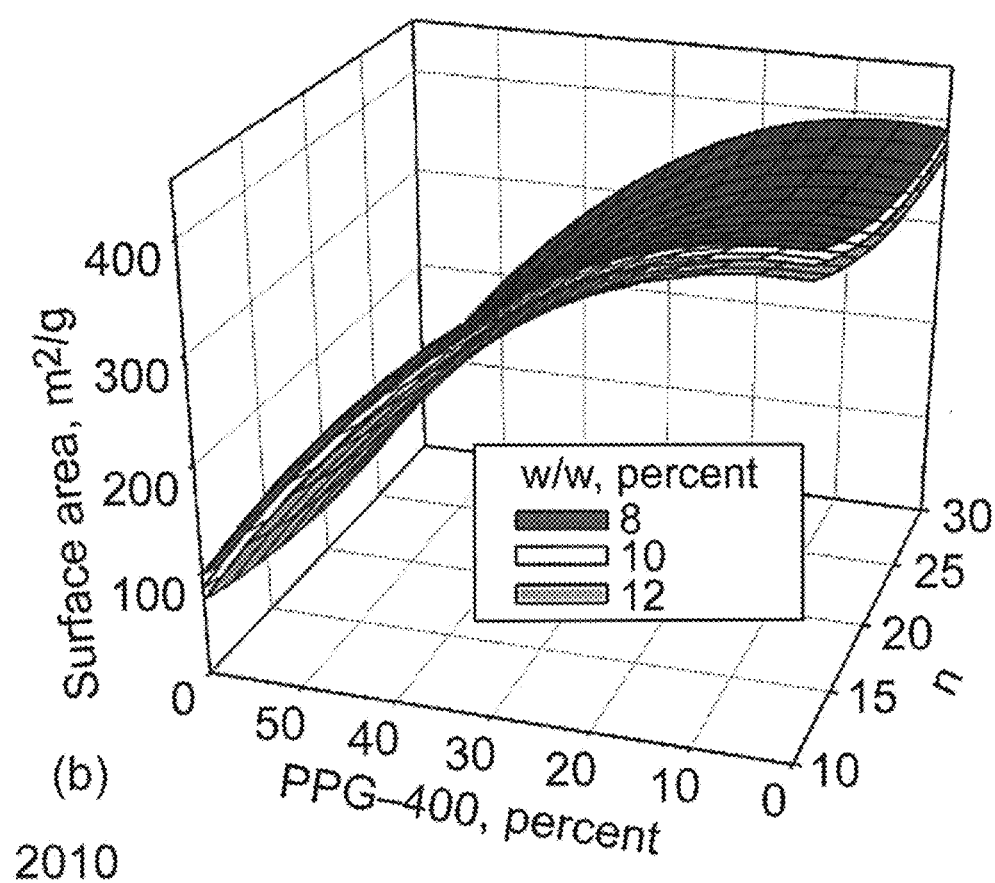
Figure 20C:
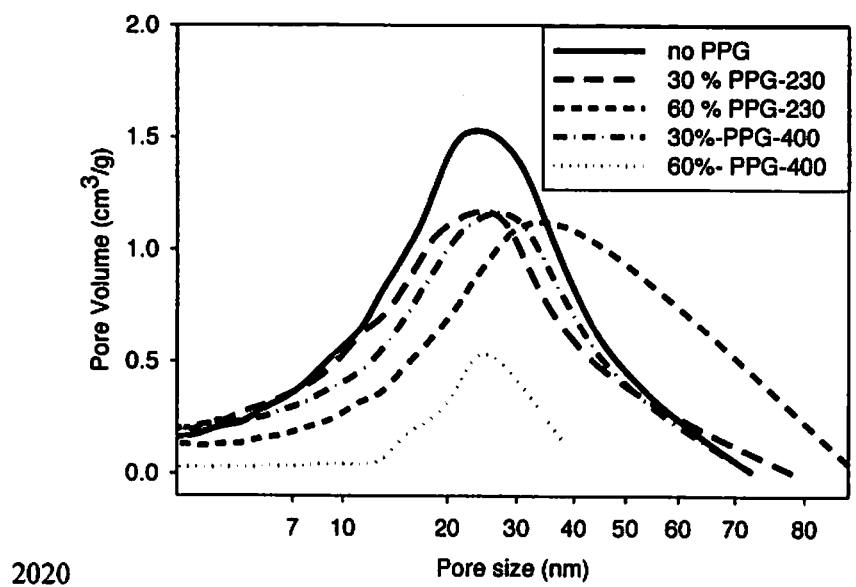
FIG. 20C shows a graph of relative pore volume versus pore diameter for selected formulations formed using processes in accordance with some embodiments.

Graphs 2000, 2010 of FIGS. 20A and 20B show the empirical model of surface area change of the aerogels made with PPG (PPG-230% and PPG-400%, respectively) and/or ODA and using PMAO as cross-linker. BET surface areas of the aerogels (PPG-230: $R^2=0.96$, Standard deviation=13.11 m²/g and PPG-400: $R^2=0.99$, Standard deviation=15.23) ranged from 47 m²/g to over 453 m²/g, depending on the formulation used. Increases in the PPG diamine percentage and increases in the total precursor weight decrease the surface area. At higher PPG-400 percentage, this drop of surface area is more obvious, which may be due to the collapse of the pores caused by the high shrinkage. Graph 2020 of FIG. 20C shows relative pore volume versus pore diameter for selected formulations, from which it can be seen that the aerogels have pore diameters in the range of meso- to macropores, with the distribution peaking around 23-35 nm. Increasing the PPG-230 percentage the plot, becomes wider and the major distribution peak shift to larger pore sizes. With increasing PPG-400 percentage, the major pore size distribution peaks do not shift, but the pore volume decreases.

Figure 21:
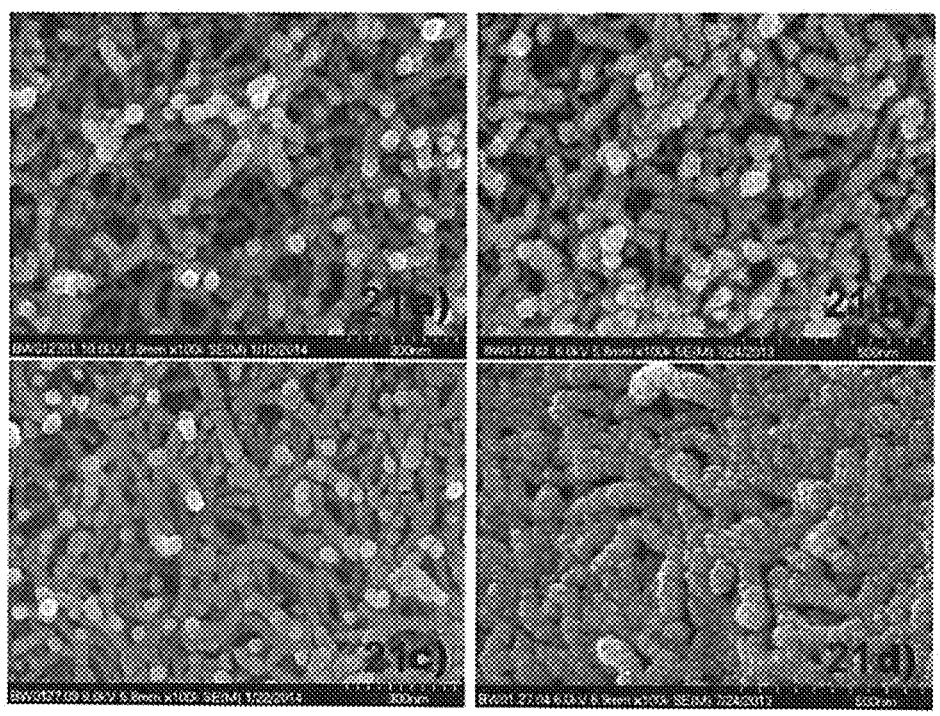
FIG. 21 shows Field Emission Scanning Electron Micrographs (FESEM) of the selected PMAO cross-linked aerogels made with PPG-230 or PPG-400, according to an embodiment of the present invention.

Field Emission Scanning Electron Micrographs (FESEM) of the selected PMAO cross-linked aerogels made with PPG-230 or PPG-400 are shown in images 2100 of FIG. 21. The aerogels show a three dimensional network connected together by polymer fibers. It can be concluded from FIGS. 21A and 21C that increasing the loading amount of PPG diamines causes the aerogels have more densely packed polymer fibers. Due to the higher molecular weight, the aerogels that made with PPG-400 have polymer fibers with much wider diameter.

Figure 22:
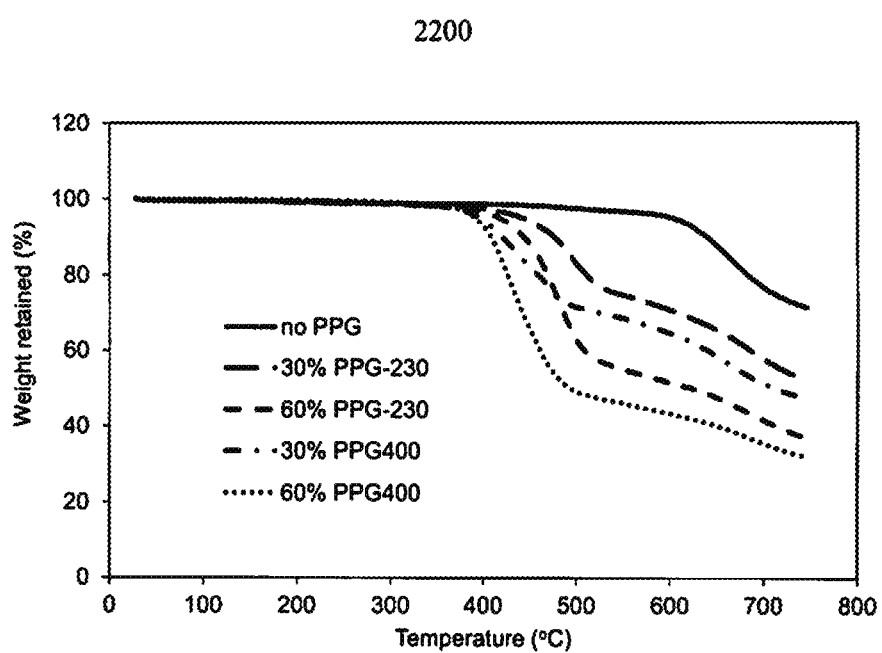
FIG. 22 shows a TGA curve of select PMAO cross-linked aerogel samples made with PPG-230 or PPG-400 in $N_2$, according to an embodiment of the present invention.

As shown in Graph 2200 of FIG. 22, the weight loss around 400° C. is due to the aliphatic groups on the cross-linkers. As expected, increasing the percentages and the molecular weight of the PPG diamines, the onset decomposition temperature and char yield decrease. All formulations have little weight lost around 200° C., which indicates that imidization is completed and NMP is removed completely by exchanging solvent to acetone and supercritical drying.

Figure 23A:
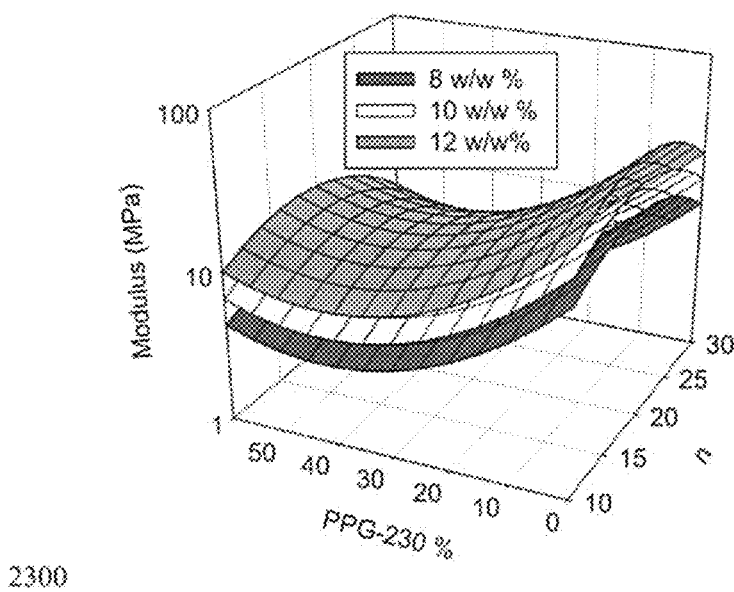
FIG. 23A shows an empirical model of compression moduli change of aerogels made with ODA and/or PPG-230, according to an embodiment of the present invention.

Compression testing was performed on the cross-linked aerogels. All the samples were compressed to 80% strain. Graph 2300 of FIG. 23A shows an empirical model of compression moduli change of aerogels made with ODA and/or PPG-230. The modulus is affected by the total precursor amount, n and PPG-230 percentage. The higher the total precursor amount, the higher the observed modulus. The aerogels with PPG-230 have lower moduli than the aerogels without PPG-230.

Figure 23B:
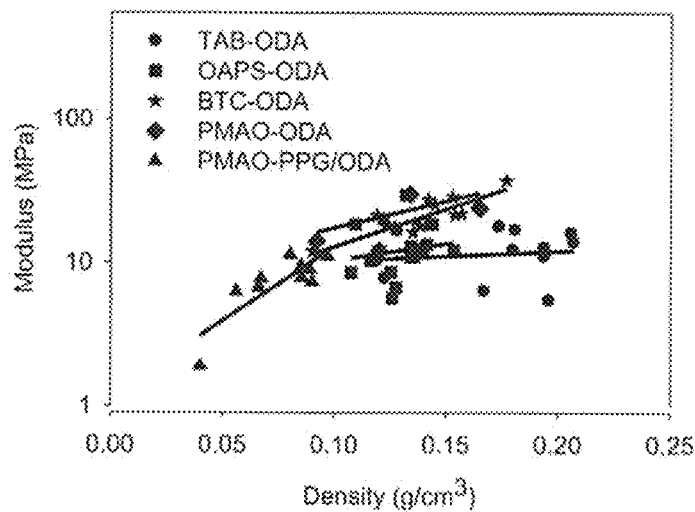
FIG. 23B shows the relationship of the densities and moduli of different cross-linked aerogels, according to an embodiment of the present invention.

Graph 2310 of FIG. 23B shows the relationship of the densities and moduli of different cross-linked aerogels. The moduli of the PMAO cross-linked aerogels follow the general trend that modulus increases with the increasing of the density. As shown in FIG. 23B, the moduli of PMAO cross-linked aerogels made with ODA are similar to those TAB, OAPS, or BTC cross-linked aerogels made with ODA. PMAO cross-linked aerogels made with the combination of PPG-230 and ODA show higher slope (10.36) than PMAO cross-linked aerogels made with ODA only (3.79) and also TAB, OAPS, or BTC cross-linked aerogels made with ODA.

Figure 24:
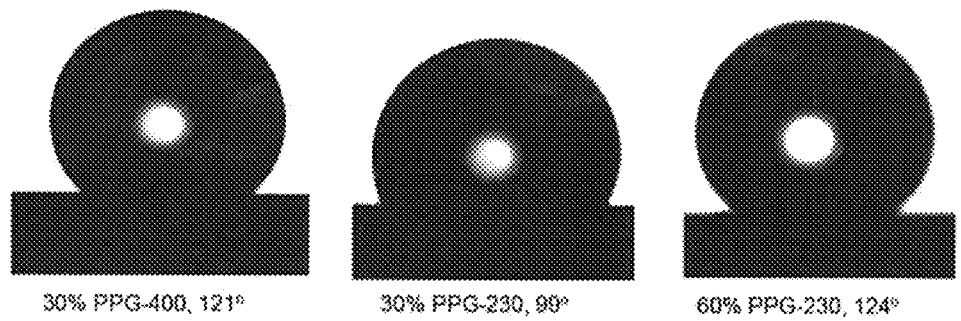
FIG. 24 shows observed contact angles for formulations having 30% PPG-400, 30% PPG-230, or 60% PPG-230 separately, according to an embodiment of the present invention.

The samples without PPG diamines are hydrophilic for the carbonyl groups and the oxygen linkages in the polyimide oligomers tend to absorb water and form hydrogen bond, so water drops added on the surfaces were absorbed quickly. The formulations with PPG diamines have contact angle ranged from 90-126°, as shown in observed contact angles 2400 of FIG. 24, which is much higher than the previous reported OAPS or TAB cross-linked polyimide aerogels.

Figure 25A:
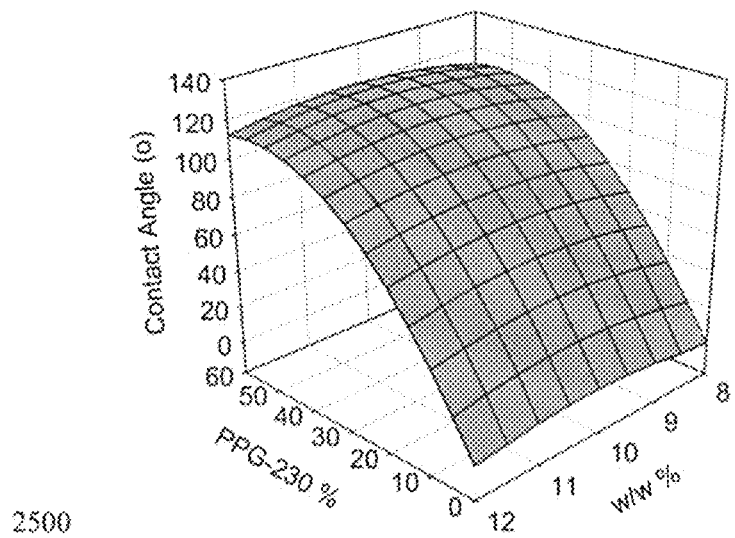
FIGS. 25A-25B show an empirical model of the contact angle change of the aerogels made with PPG-230 and PPG-400, according to an embodiment of the present invention.
Figure 25B:
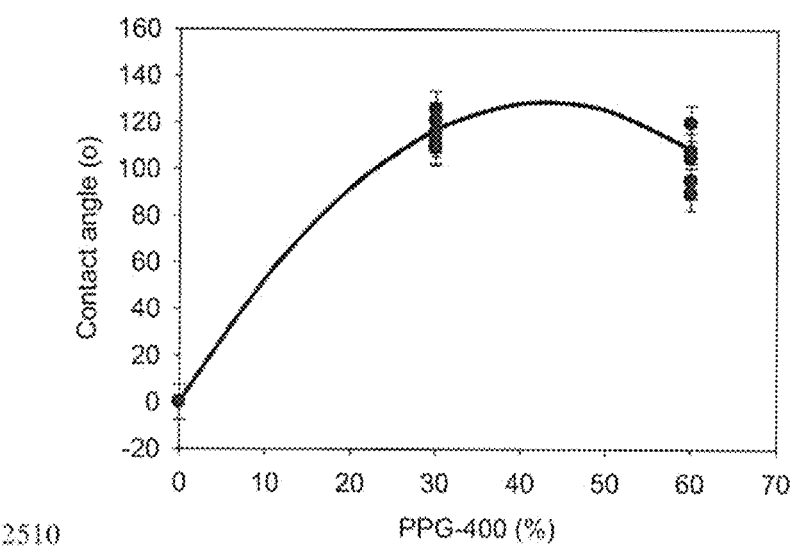

Graphs 2500, 2510 of FIGS. 25A and 25B show an empirical model of the contact angle change of the aerogels made with PPG-230 (FIG. 25A, $R^2$=0.99, Standard deviation=6.61) and PPG-400 (FIG. 25B, $R^2$=0.98, Standard deviation=7.26). The n value does not affect contact angle for all the aerogels made with PPG-230 or PPG-400. As shown in FIG. 25A, although the aerogels made with PPG-230 is both functions of total weight and PPG-230 percentage, PPG-230 percentage is a major factor. Increasing the PPG-230 percentage causes increasing contact angle, and levels off at higher PPG-230 percentage. The contact angles of the aerogels made with PPG-400, shown in FIG. 25B, are only the function of PPG-400 percentages in the aerogel backbone structure. The contact angles of the aerogels made with PPG-400 are above 90° when more than 20 mol % PPG-400 is used and reaches maximum at 40 mol % PPG-400. The moisture resistance is determined by the ratio and distribution of hydrophobic groups and hydrophilic groups in the polyimide oligomers. The aliphatic groups on PPG-230, PPG-400, and PMAO can contribute to the final hydrophobicity of the samples, but the oxygen linkage and carbonyl groups in the backbone structures oppose the hydrophobicity of the samples.

The roughness of a surface can also affect the hydrophobicity of the aerogels. Aerogels with more than 40 mol % PPG-400 shrink considerably, causing the polymer fibers to be quite densely packed in the aerogels, which can be observed from the SEM image shown in FIG. 21*d*. The surface of the aerogel made with high percentage PPG-400 became smoother, so the water drop can easily wet the surface.

Thin films of poly(maleic anhydride) cross-linked polyimide aerogels were fabricated. The thickness of the film was determined by the casting Dr. Blade gap, the solution viscosity, casting speed and head pressure, as well as shrinkage. With a casting speed of 80 cm/min and a 12" wide Dr. Blade with a gap of 0.762 mm, the films have a thickness of nominally 0.3 to 0.5 mm and density around 0.10-0.15 g/cm$^3$.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that embodiments of the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An aerogel, comprising:
a polyimide oligomer; and
a poly(maleic anhydride) cross-linker, the poly(maleic anhydride) cross-linker connected to the polyimide oligomer, the polyimide oligomer comprising a diamine and a dianhydride in a ratio of (n+1) to n where n is the number of repeat units in the polyimide oligomer.

2. The aerogel of claim 1, the poly(maleic anhydride) cross-linker being selected from the group comprising poly (maleic anhydride-alt-1-octadecene), poly(ethylene-alt-maleic anhydride), poly (isobutylene-alt-maleic anhydride), and poly(methyl vinyl ether-alt-maleic anhydride).

3. The aerogel of claim 1 wherein the diamine is 4, 4'-oxidianiline.

4. The aerogel of claim 1 wherein the diamine is a combination of 2, 2'-dimethylbenzidine and 4, 4'-oxidianiline.

5. The aerogel of claim 1 wherein the diamine is poly (propylene glycol) bis(2-aminopropyl ether) (PPG-230).

6. The aerogel of claim 1 wherein the diamine is poly (propylene glycol) bis(2-aminopropyl ether) (PPG-400).

7. The aerogel of claim 6 wherein the aerogel has a contact angle of up to 124°.

8. The aerogel of claim 1 wherein the diamine is 2, 2'-dimethylbenzidine.

9. The aerogel of claim 1 wherein the aerogel has a porosity of greater than 88%.

10. The aerogel of claim 1, the polyimide oligomer comprising an aliphatic diamine.

11. A process for making a polyimide aerogel, comprising:
providing a poly(amic acid) oligomer solution;
adding poly(maleic anhydride) to the poly(amic acid) oligomer solution to cross-link poly(amic acid) oligomers of the poly(amic acid)oligomer solution; and
chemically imidizing the cross-linked poly(amic acid) oligomers of the provided poly(amic acid) solution to form a polyimide oligomer solution, wherein the polyimide oligomers are amine terminated.

12. The process of claim 11, the step of creating the polyimide oligomer solution further comprises:
generating amine-capped polyimide oligomers, the generating comprising:
dissolving diamine in solution;
adding dianhydride to the diamine in solution;
adding acetic anhydride to the anhydride and diamine solution and mixing; and
adding acetic anhydride and triethylene amine to form a cross-linked polyimide gel.

13. The process of claim 12, further comprising drying the cross-linked polyimide gel.

14. The process of claim 11, comprising:
dissolving the poly(amic acid) oligomers N-methyl-2-pyrrolidone (NMP) to form a solution.

15. The process of claim 11, comprising:
chemically imidizing the cross-linked poly(amic acid) oligomers into polyimide at room temperature using acetic anhydride and triethyleneamine.

16. The process of claim 14, comprising:
allowing the solution to gel.

17. The process of claim 16, comprising:
converting the gel to an aerogel by supercritical fluid extraction.

18. The process of claim 12, wherein the polyimide solution comprises various dianhydrides and diamines.

19. The process of claim 12, wherein the dianhydrides are selected from a group consisting of benzophenone-3,3',4,4'-tetracarboxylic dianhydride (BTDA) and biphenyl-3,3',4,4'-tetracarboxylic dianhydride (BPDA).

20. The process of claim 12, wherein the diamines are selected from a group consisting of 3,4-oxydianiline (3,4-ODA), 4,4-oxydianiline (4,4-ODA or ODA), p-phenylene diamine (PPDA), DMBZ, 4,4-bis(4-aminophenoxy)biphenyl, 2,2-bis[4-(4-aminophenoxy)phenyl]propane, bisaniline-p-xylidene (BAX), m-phenylenediamine, 4,4-bis(aminophenoxy)-2,2-dimethylbiphenyl (BAPD), 4,4'-[1,3-phenylenebis(1-methyl-ethylidene)]bisaniline (bisaniline-M), 2,2-bis[4-(4-aminophenoxy)phenyl]hexafluoropropane (HFBAPP), and (poly(propylene glycol) bis(2-aminopropyl ether) (PPG-230 or PPG-400).

21. The process of claim 11, further comprising:
dissolving diamines in solution before adding a dianhydride;
dissolving the dianhydride; and
chemically imidizing the cross-linked poly(amic acid) oligomers into polyimide.

22. The process of claim 11, the poly(maleic anhydride) being selected from a group consisting of:
poly(maleic anhydride-alt-1-octadecene), poly(ethylene-alt-maleic anhydride), poly (isobutylene-alt-maleic anhydride), and poly(methyl vinyl ether-alt-maleic anhydride).

23. The process of claim 11, wherein the solution can be cast into a mold to form special shapes or cast as a film and then forms a gel.

24. The process of claim 11, wherein the poly(maleic anhydride) cross-linked polyimide aerogel made with 50% DMBZ+50% ODA has a lower shrinkage and a lower density than those made with DMBZ or ODA after heated at 200° C. and 300° C.

* * * * *